United States Patent
Sato et al.

(10) Patent No.: US 10,571,626 B2
(45) Date of Patent: Feb. 25, 2020

(54) BACKLIGHT UNIT OF DISPLAY DEVICE

(71) Applicant: Panasonic Liquid Crystal Display Co., Ltd., Hyogo (JP)

(72) Inventors: Naoki Sato, Hyogo (JP); Ryosuke Yabuki, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/940,965

(22) Filed: Mar. 30, 2018

(65) Prior Publication Data
US 2019/0302337 A1    Oct. 3, 2019

(51) Int. Cl.
*F21V 8/00* (2006.01)
*G01D 11/28* (2006.01)
*G04G 9/00* (2006.01)

(52) U.S. Cl.
CPC ........... *G02B 6/009* (2013.01); *G02B 6/0068* (2013.01); *G01D 11/28* (2013.01); *G04G 9/0041* (2013.01)

(58) Field of Classification Search
CPC .... G04G 9/0041; G01D 11/28; G02B 6/0011; G02B 6/0013; G02B 6/0028; G02B 6/0015

USPC ............................................. 362/23.1, 23.09
See application file for complete search history.

(56) References Cited

U.S. PATENT DOCUMENTS

| | | | | |
|---|---|---|---|---|
| 7,712,910 | B2 * | 5/2010 | Ng | G01D 11/28 |
| | | | | 362/23.1 |
| 10,151,943 | B2 * | 12/2018 | Ahn | B60K 37/02 |
| 2006/0078267 | A1 * | 4/2006 | Cha | G02B 6/0013 |
| | | | | 385/146 |
| 2013/0322111 | A1 * | 12/2013 | Nishitani | G02B 6/0028 |
| | | | | 362/603 |
| 2015/0185388 | A1 * | 7/2015 | Hayden | B60K 37/02 |
| | | | | 362/23.09 |
| 2017/0059771 | A1 * | 3/2017 | Yuki | G02F 1/133615 |
| 2017/0090099 | A1 * | 3/2017 | Lee | G02B 6/002 |
| 2017/0090113 | A1 * | 3/2017 | Yuki | G02B 6/0021 |
| 2017/0123140 | A1 * | 5/2017 | Han | G02B 6/0045 |
| 2017/0153486 | A1 | 6/2017 | Ahn et al. | |
| 2017/0336553 | A1 * | 11/2017 | Yuki | G02B 6/0031 |

* cited by examiner

*Primary Examiner* — William N Harris
(74) *Attorney, Agent, or Firm* — HEA Law PLLC

(57) ABSTRACT

A display device with at least one hole is susceptible to poor image quality because of the luminance difference between the front of the hole and behind the hole in relation to the plurality of light sources located along one edge of the backlight unit. To decrease the luminance difference, the distance between adjacent light sources are adjusted, the light ray directions are altered and cutout sections are provided.

9 Claims, 27 Drawing Sheets

| Configuration of Backlight Unit | Luminance Ratio Between Front and Back of Hole |
|---|---|
| Reference Embodiment | 0.56 |
| Without a reflector tape and a reflector band | - |
| First Embodiment | 0.64 |
| Second Embodiment | 0.64 |
| Third Embodiment | 0.57 |
| Fourth Embodiment | 0.72 |
| Fifth Embodiment | 0.77 |
| Sixth Embodiment | 0.72 |

FIG. 17

BACKLIGHT UNIT OF DISPLAY DEVICE

TECHNICAL FIELD

The present disclosure relates to a backlight unit of a display device, particularly, a display device with a hole.

BACKGROUND

Recent developments in technology have emphasized the need for display devices in all aspects of everyday activities. Visual information is almost a human necessity enabling the individual and society to function at maximum efficiency.

Display devices can be divided into two classes. Emissive type displays, such as cathode ray tubes (CRT), electro luminescence (EL), light emitting diodes (LED), vacuum fluorescent display (VFD), field emission display (FED), plasma display panel (PDP), and similar displays are capable of displaying images without the aid of a lighting unit or a backlight unit due to their ability to spontaneously emit light. On the other hand, non-emissive type displays, such as liquid crystal displays (LCD), are incapable of displaying images on their own and therefore require the inclusion of a lighting unit or backlight unit as they are not capable of spontaneous emission of light.

One of the widely used and ubiquitous display devices is the LCD since it is inexpensive. Better LCD technologies such as In Plane Switching (IPS) have vastly improved the display quality of LCDs while maintaining lower power consumption and lower heat dissipation in comparison to similarly sized PDP or CRT displays.

With the increasing use of display devices in various fields, there is a constant push for LCD devices to have better color reproduction, high contrast ratios, and low power consumption. Even the form factor and other desired physical aspects of LCD devices, such as low weight, thinness, varying shapes and even flexibility have been dominant considerations in the market. In particular, certain applications require LCD devices to contain one or more holes to allow material or parts to go through the hole.

The presence of a hole in the LCD device creates a difference in the luminance values, or the luminous intensity per unit area of light, between the front of the hole and behind the hole in relation to the location of the light sources. As such, the light emitted by the backlight unit on the liquid crystal panel is uneven, resulting in lower image quality. Hence, there is a need to reduce this difference in luminance values in order to increase the image quality of the LCD device.

SUMMARY

The present invention overcomes the foregoing problems by providing for, first, a specifically optimal placement of the light sources relative to a hole; second, a specifically optimal light ray angle to produce an even luminescence around a hole; and, third, a cut-out of a specific portion of the light guide plate relative to a hole.

An object of the present disclosure is to address the problem presented by the above described configuration. Specifically, the object of the present disclosure is to provide a display device having at least one hole wherein the difference in luminance values between in front of the hole and behind the hole, is reduced.

To address this problem, the present disclosure discloses a display device, in particular, an LCD device comprising a liquid crystal panel and a backlight unit located in the lower portion of a liquid crystal panel. A lower cover accommodates and fixes the liquid crystal panel and the backlight unit.

The LCD device has at least one hole in plan view in a predetermined region, allowing another material or part to pass therethrough.

The backlight unit of the LCD device is comprised of a light guide plate with at least one hole in plan view, a plurality of light sources in a linear array along a first edge of the light guide plate, and a reflector tape on a second edge of the light guide plate opposite to the first edge.

The at least one hole may be filled with a material having a light transmittance different from a light transmittance of the light guide plate.

The backlight unit may be further comprised of a reflector sheet on a rear surface of the light guide plate and a reflector band around the inner periphery of the hole.

The light emitted by the plurality of light sources enters the lateral surface of the first edge of the light guide plate. The reflector tape reflects the light incident to the second edge of the light guide plate while the reflector band reflects the light incident to the walls of the hole, preventing light from escaping through the walls of the hole. The reflector sheet reflects the light transmitted through the rear surface of the light guide plate to the upper surface thereof. The reflection of the light reduces the loss thereof and enhances its uniformity.

The plurality of light sources is comprised of: a first light source being located with shortest distance from the at least one hole among the plurality of light sources and being adjacent to both a second light source and a third light source from the plurality of light sources; the second light source with a shorter or equal distance from the at least one hole than that of the third light source; and the third light source.

A distance between the at least one hole and the first light source may be the same as a distance between the at least one hole and the second light source.

In an embodiment according to the present disclosure, a first distance between the first light source and the second light source may be different from a second distance between the first light source and the third light source. In particular, the first distance may be greater than the second distance.

In another embodiment according to the present disclosure, a first light ray angle between a line normal to the first edge and a first centermost light ray of the first light source, and a second light ray angle between the line and a second centermost light ray of the second light source may be both more than 5 degrees, and a third light ray angle between the line and a third centermost light ray of the third light source may be less than 2 degrees. In particular, both the first light ray angle and the second light ray angle may be more than 10 degrees and less than 50 degrees.

In a further embodiment according to the present disclosure, the first light ray angle and the second light ray angle may be more than 5 degrees, and the third light ray angle may be less than 2 degrees. The first centermost light ray and the second centermost light ray may cross each other.

In still another embodiment according to the present disclosure, the first edge may have at least one cutout section, a midpoint in width of the at least one cutout section being located between the first light source and the second light source. In particular, a width of the cutout section may be greater than the first distance between the first light source and the second light source. The first light source and the second light source both counter the at least one cutout section while the third light source counters the first edge other than the at least one cutout section.

In yet another embodiment according to the present disclosure, the width of the at least one cutout section may be greater than the first distance between the first light source and the second light source. The first light source and the second light source both counter the at least one cutout section while the third light source counters the first edge other than the at least one cutout section. Both the first light ray angle and the second light ray angle may be more than 5 degrees, and the third light ray angle may be less than 2 degrees.

In an additional embodiment according to the present disclosure, the width of the at least one cutout section may be greater than the first distance, wherein the first distance may be less than the second distance. The first light source and the second light source both counter the at least one cutout section while the third light source counters the first edge other than the at least one cutout section. Both the first light ray angle and the second light ray angle may be more than 5 degrees, and the third light ray angle may be less than 2 degrees.

As described above, the display device having at least one hole according to the embodiments of the present disclosure has a reduced difference in luminance values between the front of the hole and behind the hole in relation to the location of the plurality of light sources. As a result, the image quality of the display device is enhanced.

BRIEF DESCRIPTION OF THE DRAWINGS

Both described and other features, aspects and advantages of a backlight of display device will be better understood with reference to the following drawings.

FIG. 17 is a table summarizing the luminance ratio of the front of the hole and behind the hole, based on the results of the simulations.

DETAILED DESCRIPTION

Figure 1:
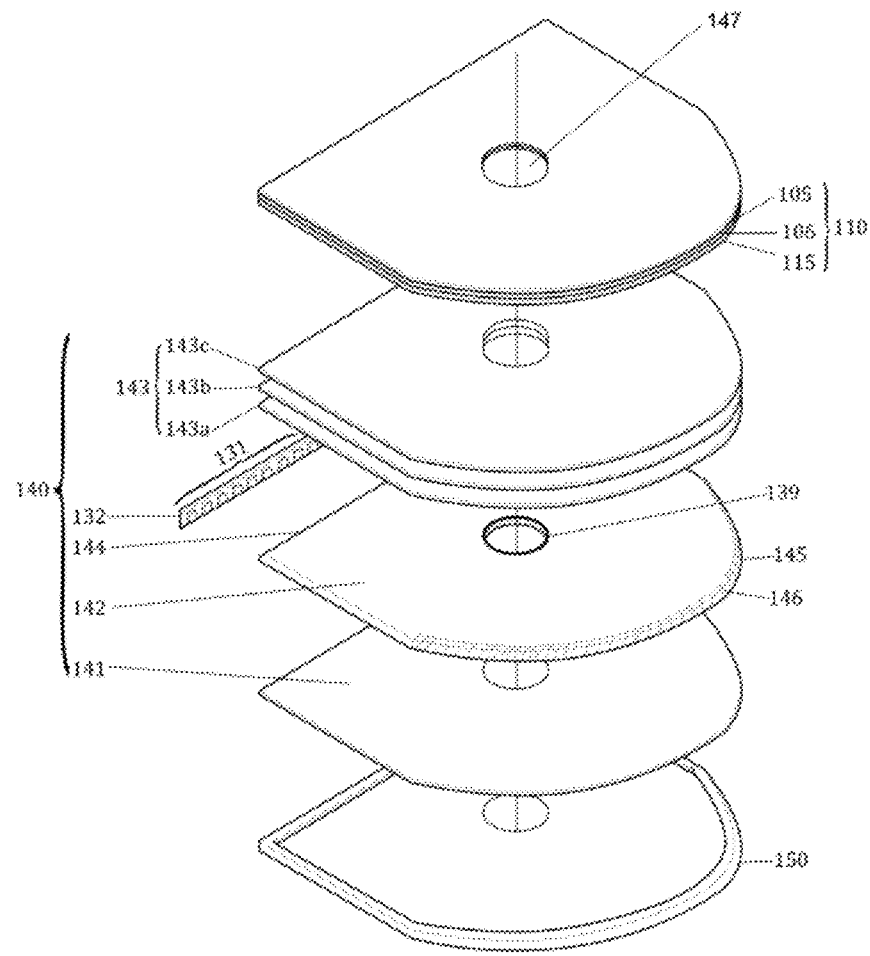
FIG. 1 is an exploded perspective view schematically illustrating the structure of the display device according to the embodiments of the present disclosure.

Embodiments of the present disclosure will be described with reference to the drawings for a greater understanding of the embodiments and so as to help explain the principles used in this disclosure in order to guide person having ordinary skill in the art.

The embodiments in the present disclosure will be presented dearly and in reference to the drawings but in no case shall the present disclosure be limited to these embodiments and drawings. This disclosure herein may be implemented in ways that are not described by the embodiments and drawings but are covered by the present disclosure. The embodiments and drawings in this application are meant to give a full and sufficient disclosure of the invention but the scope of the invention must be defined in respect to the claims appended to this application. Furthermore, the drawings are not necessarily drawn to scale and may be exaggerated for purposes of clarity of presentation. Similarly, number labels are used such that similar reference numbers refer to like or similar elements as used in the other drawings in this specification.

The backlight unit in this present disclosure is meant to be used in display devices that are of the non-emissive type, as well as in emissive type displays where a backlight is still necessary to improve the image quality of the display. This disclosure is therefore not necessarily limited to LCD displays but is applicable to all present and future displays that may require a backlight unit.

The shape of the display wherein the backlight unit described in the present disclosure may be used is not limited to the embodiments of this present disclosure. The backlight unit may be used in a traditional rectangular display device or any display device with a curved edge such as those described in the embodiments of this present disclosure. It may also be used in circular or curvilinear display devices where the array of light sources are not necessarily arranged in a straight line but may also be placed along a curved edge of the display device. In other words, the disclosure is intended for a display device of any shape or size where the solution or principle provided in the present disclosure is applicable.

The present disclosure contemplates a display device having one or more holes passing through its display panel and backlight unit. The hole(s) may be used to allow another material or part to pass through or to be inserted into the display device. The application of this material or part may be varied including, but not limited to, a part for the provision of a mechanical dial such as the hour and minute hands of a clock or the dial or needle hand of weighing scale and the like. The material or part may be used to combine a digital interface through the display device and an analog or physical part for greater functionality. A hole may also be used without inserting another material or part but only with a support or guide member such that the hole does not expose the other parts of the display device and the backlight unit. For example, a slot machine or any coin-operated machine may include a coin slot through a display device which may allow for greater user convenience and engagement.

Figure 3:
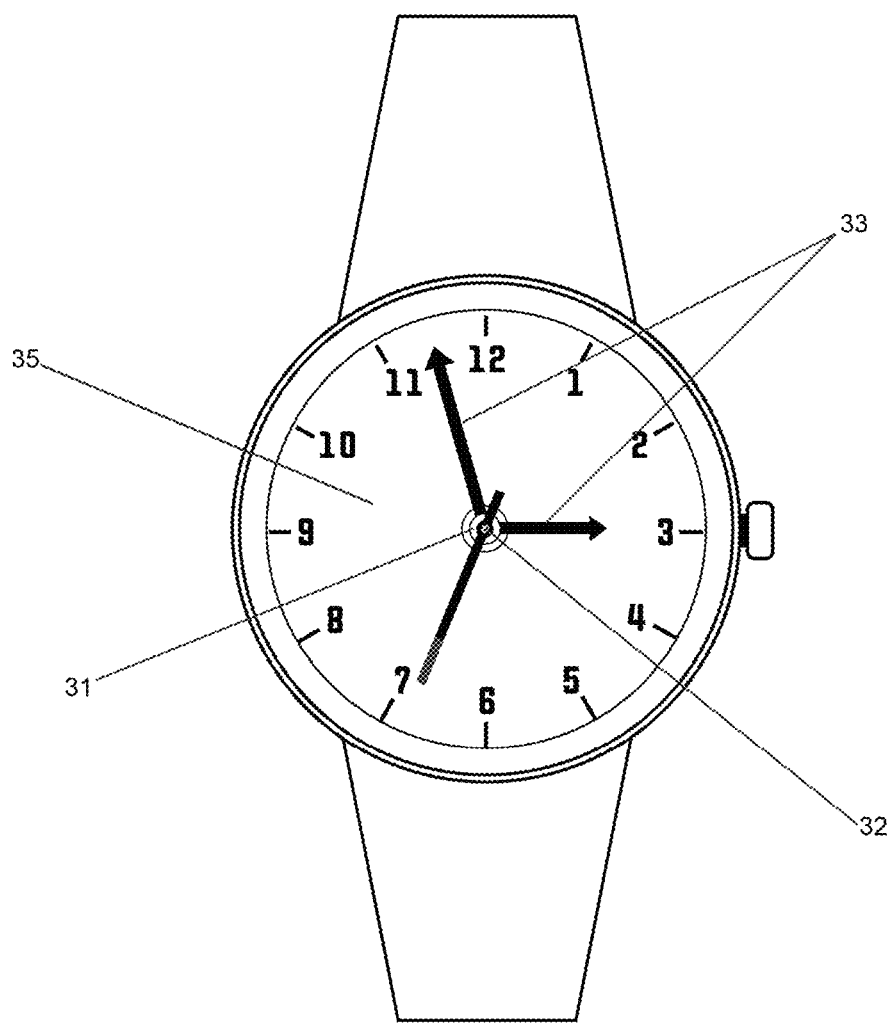
FIG. 3 is a plan view of a watch.
Figure 4:
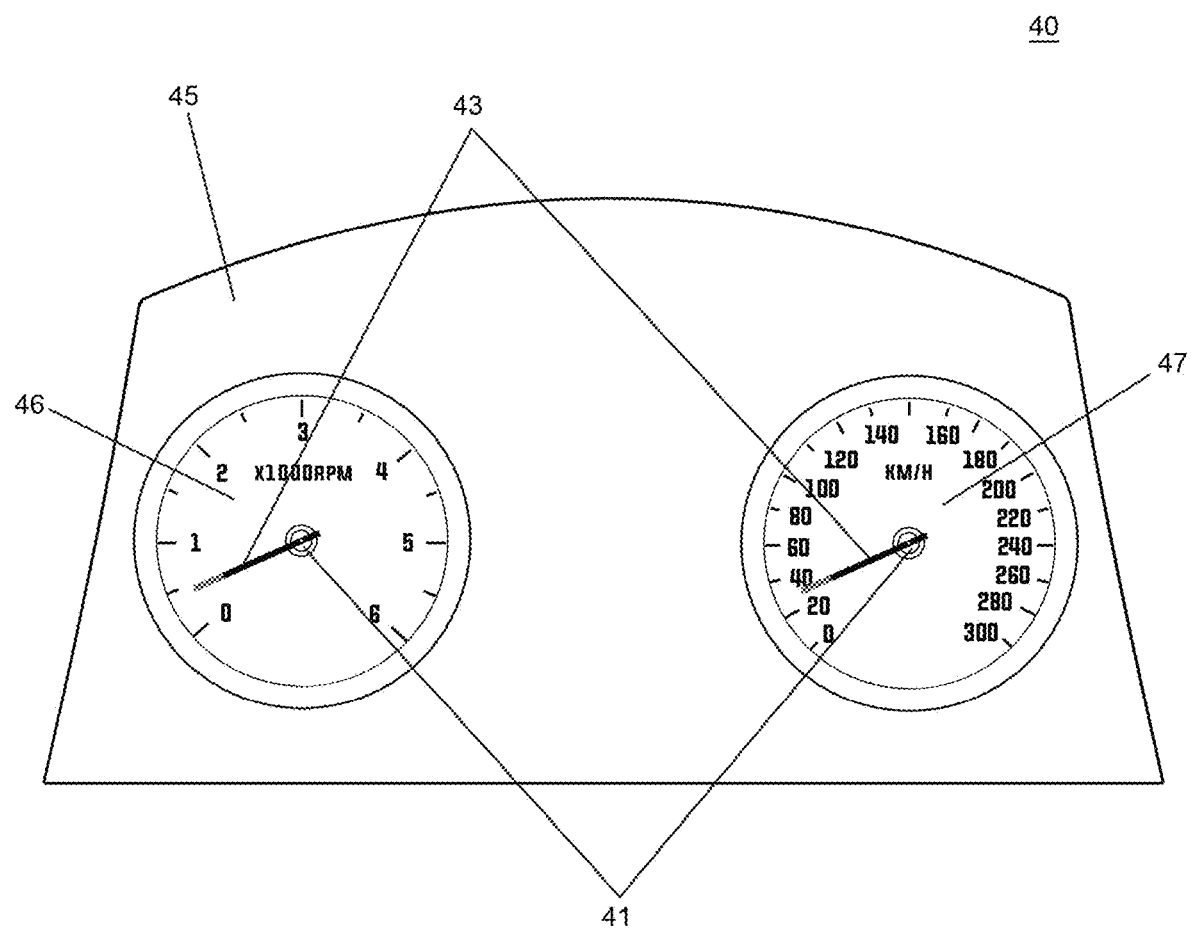
FIG. 4 is a plan view of a vehicle dashboard.
Figure 5:
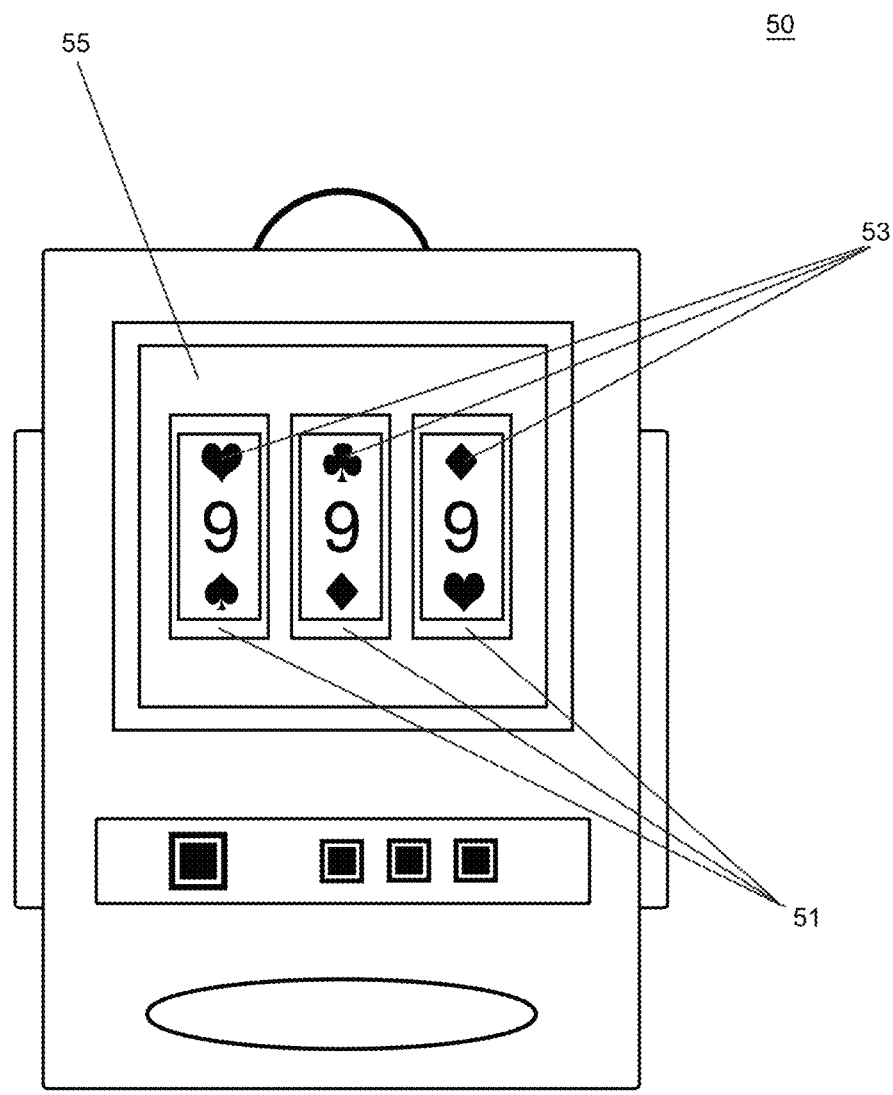
FIG. 5 is a is a front view of a slot machine.
Figure 6:
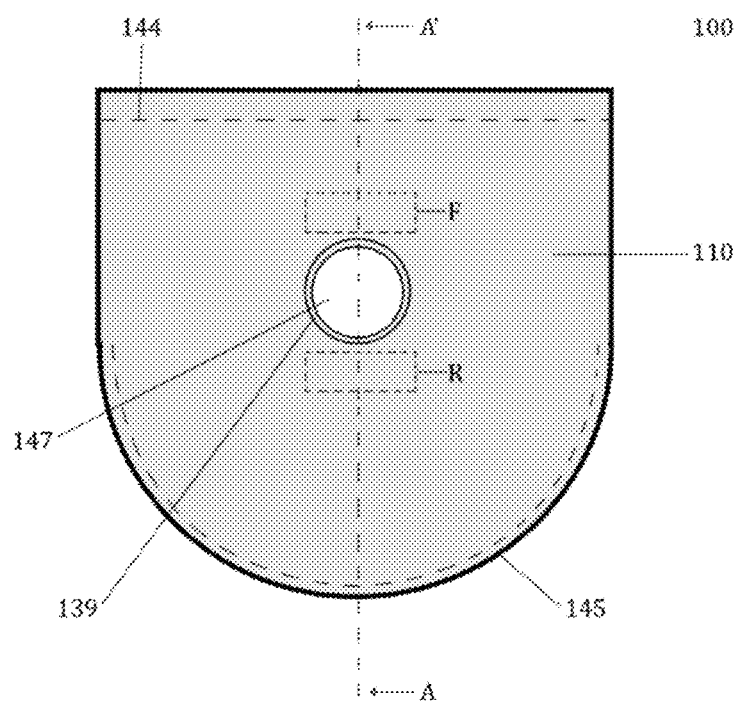
FIG. 6 is a plan view schematically illustrating the display device according to the embodiments of the present disclosure.

FIGS. 3, 4 and 5 are examples of display devices having one or more holes. FIG. 3 illustrates an LCD device 35 used in watch 30 in which the shaft 32 holding hands 33 of the watch 30 pass through the hole 31. FIG. 4 shows an LCD device 45 used in vehicle dashboard 40 wherein the needles 43 of the tachometer 46 and the speedometer 47 penetrate the holes 41. FIG. 5 is an LCD device 55 used in slot-machine-type game machine 50 in which the LCD device 55 has three (3) holes 51, through which the surfaces of the rotating drums 53 are viewed. The present disclosure, however, is not in any way intended to be limited to the foregoing examples or any of the embodiments herein disclosed. What is covered by the present disclosure is the use of a display device with one or more holes which can be used by itself without inserting another material or part, or where the hole is used for the insertion of another part or member necessary for the functionality or completeness of the device or instrument for which this disclosure is used.

FIG. 1 is an exploded perspective view schematically illustrating the structure of the display device, specifically an LCD device 100, according to the embodiments of the present disclosure.

A backlight unit 140 emits light over the entire surface of a liquid crystal panel 110. The backlight unit 140 is comprised of a light guide plate 142 having a transparent material, a plurality of light sources 131 in a linear array along an edge of the light guide plate 142, and a reflector sheet 141 on a rear surface of the light guide plate 142.

The plurality of light sources 131 includes a printed circuit board (PCB) (not shown) for driving the same, and a housing 132. The plurality of light sources 131 may be composed of light emitting diodes (LEDs).

The light emitted from the plurality of light sources 131 enters the lateral surface of the edge of the light guide plate 142. Reflector sheet 141 then reflects the light transmitted through the rear surface of the light guide plate 142 to the side of optical sheets on the upper surface of the light guide plate 142 to reduce the loss of light and enhance the uniformity.

Referring to FIGS. 1, 6, 7 and 8, the LCD device 100 is comprised of the liquid crystal panel 110, the backlight unit 140, and a lower cover 150. The liquid crystal panel 110 is mounted on an upper portion of the backlight unit 140 and the lower cover 150 is coupled to a lower portion thereof to constitute a liquid crystal display device. The lower cover 150 accommodates and fixes the liquid crystal panel 110 and backlight unit 140.

In the present disclosure, one hole 147 through the liquid crystal panel 110, the backlight unit 140, and the lower cover 150 may be formed in predetermined regions of the LCD device 100. The hole 147 may have a curved shape such as a circular or elliptical shape or a polygonal shape such as a rectangular or diamond shape or may have a mixed shape with various shapes.

The liquid crystal panel 110 includes an upper substrate 105 and a lower substrate 115 positioned with the planes parallel to each other and with liquid crystal 106 being sealed in between.

The liquid crystal 106 sandwiched between the upper substrate 105 and the lower substrate 115 may be a negative liquid crystal having a negative dielectric anisotropy or a positive liquid crystal having a positive dielectric anisotropy.

Figure 7:
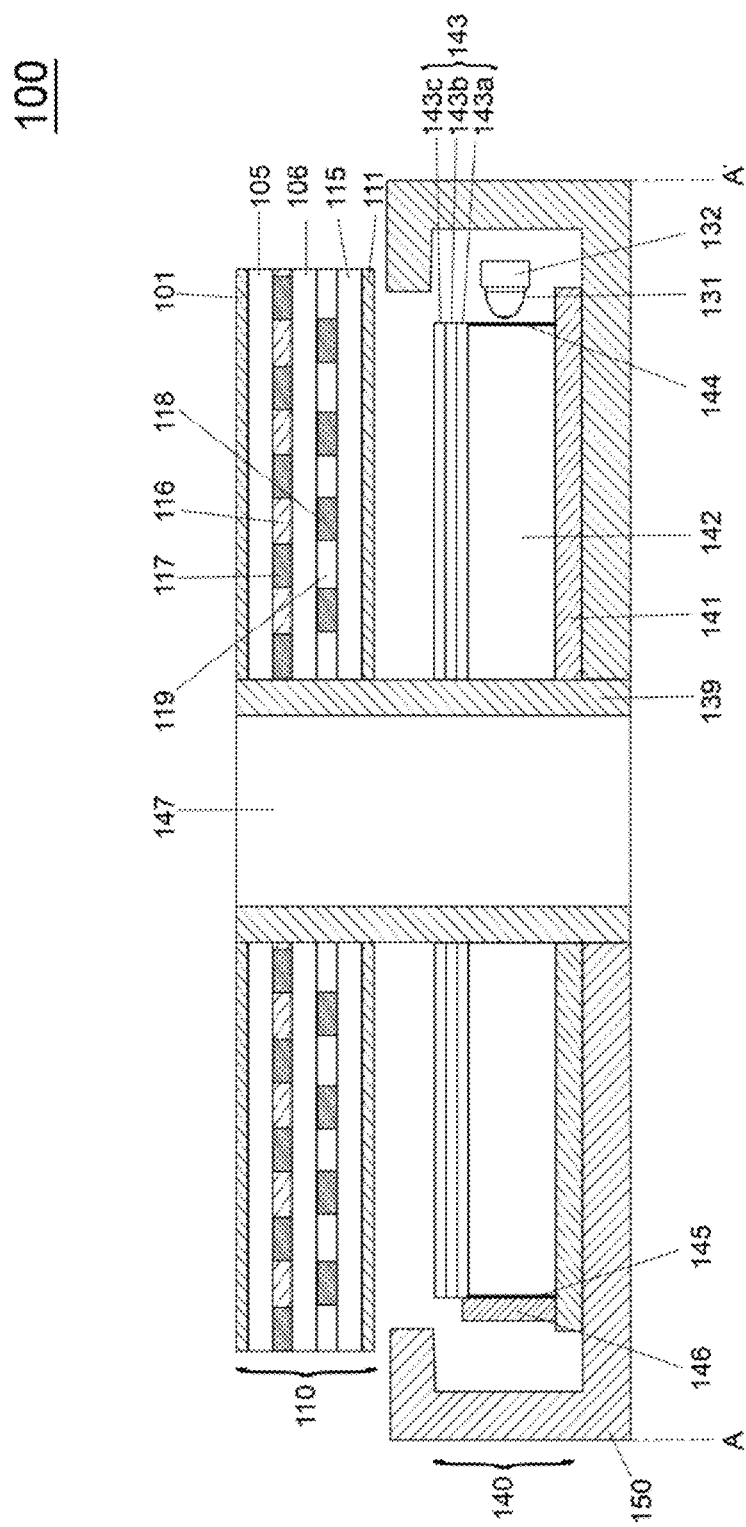
FIG. 7 is a cross-sectional view schematically illustrating a cross section taken along line A-A' in FIG. 6.

As shown in FIG. 7, the liquid crystal panel 110 also includes polarizing plates 101, 111, color filters 116, black matrix 117, spacers (not shown) and other components built on the substrates. The spacers maintain the substrates at a specific distance from each other.

Figure 2:
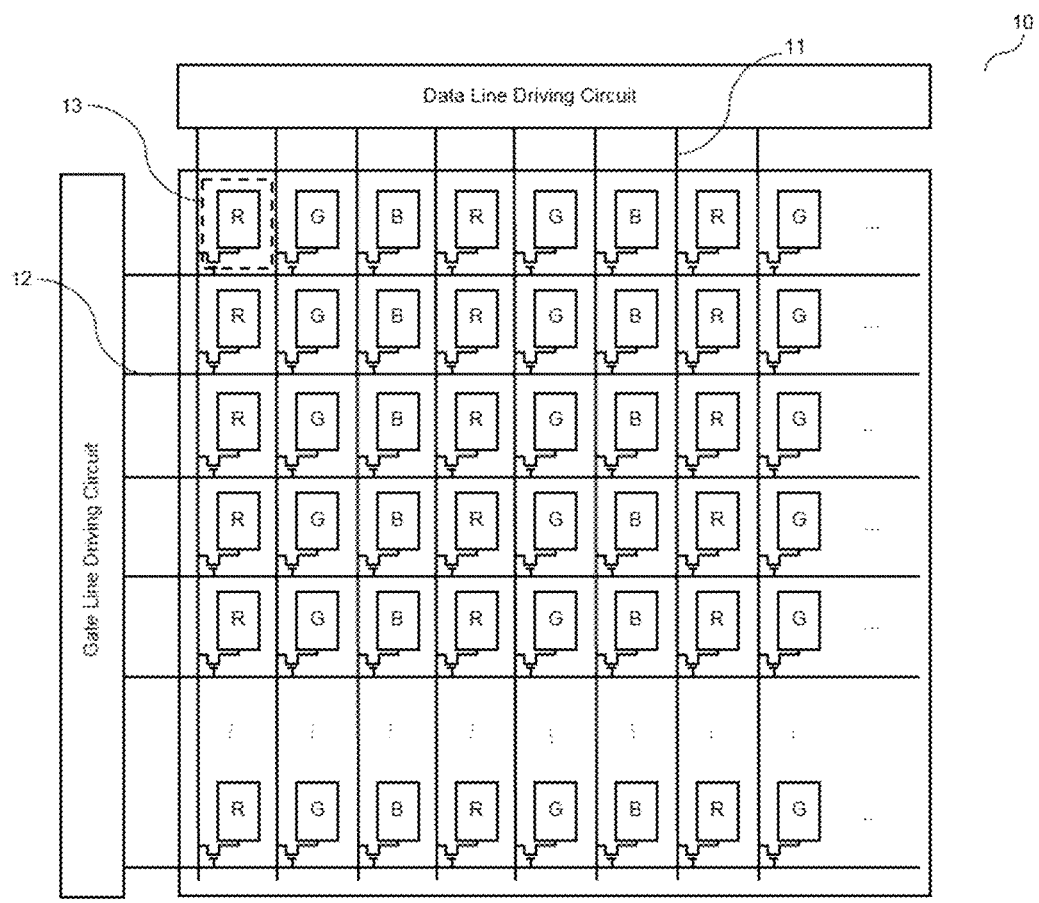
FIG. 2 is a plan view illustrating a schematic configuration of a liquid crystal panel.

As illustrated in FIG. 2, the liquid crystal panel includes a data line driving circuit, a gate line driving circuit, and a timing controller (not shown). The two (2) driving circuits drive the liquid crystal panel while the timing controller controls the driving circuit. The pixels 13 of the liquid crystal panel are arranged into a matrix shape in row and column directions. Each pixel 13 is surrounded by two adjacent data lines 11 and two adjacent gate lines 12. In FIG. 2, the column direction Is a direction in which data line 11 extends, and the row direction is a direction in which the gate line 12 extends.

To produce an image, the light from the backlight unit 140 is controlled pixel by pixel by the liquid crystal 106. To do this, a driving unit switches the alignment of the liquid crystal 106 between a state in which the polarized light incident to the polarizing plates from the backlight unit 140 is rotated by about 90°, a state in which the polarized light is not rotated, and any intermediate states as desired.

A common electrode (not shown) and a pixel electrode 118 are provided for each pixel on the lower substrate which apply an electric field to the liquid crystal 106. The liquid crystal 106 rotates by dielectric anisotropy according to the electric field between the common electrode and the pixel electrode thereby allowing or disallowing light to be transmitted through the liquid crystal 106. Thin-film transistors 119 act as switches, individually controlling the voltage on each pixel. In the present embodiment, the liquid crystal panel 110 uses IPS (in-plain switching) mode, but it is not limited to such mode. It may use different display modes such as TN (twisted nematic) mode or VA (vertical alignment) mode.

The backlight unit 140 emits light over the entire surface of the liquid crystal panel 110. The backlight unit 140 is comprised of a light guide plate 142, a plurality of light sources 131 in a linear array along the first edge 144 of the light guide plate 142, a reflector tape 146 on a second edge 145 of the light guide plate 142 opposite to the first edge 144, a reflector sheet 141 on a rear surface of the light guide plate 142, and a reflector band 139 around the inner periphery of the hole 147.

The backlight unit 140 may include a plurality of optical sheets 143 which improves the luminance and evenness of the light provided by the backlight unit 140. The optical sheets 143 may include a diffusion sheet 143a and a prism sheet 143b, and a luminance enhancement film 143c such as a dual brightness enhancement film (DBEF) and a protective sheet may be added thereto.

On a rear side of the optical sheets 143 is the light guide plate 142 which receives light from a plurality of light sources 131. The light guide plate 142 may be made of plastic such as polymethyl methacrylate (PMMA) or polycarbonate (PC) or any material capable of distributing light from the light sources evenly throughout the display.

The reflector sheet 141 is located on a rear side of the light guide plate. The reflector tape 146 is located on a second edge 145 of the light guide plate 142 opposite to the first edge 144. The reflector band 139 is located around the inner periphery of the hole 147.

Figure 8:
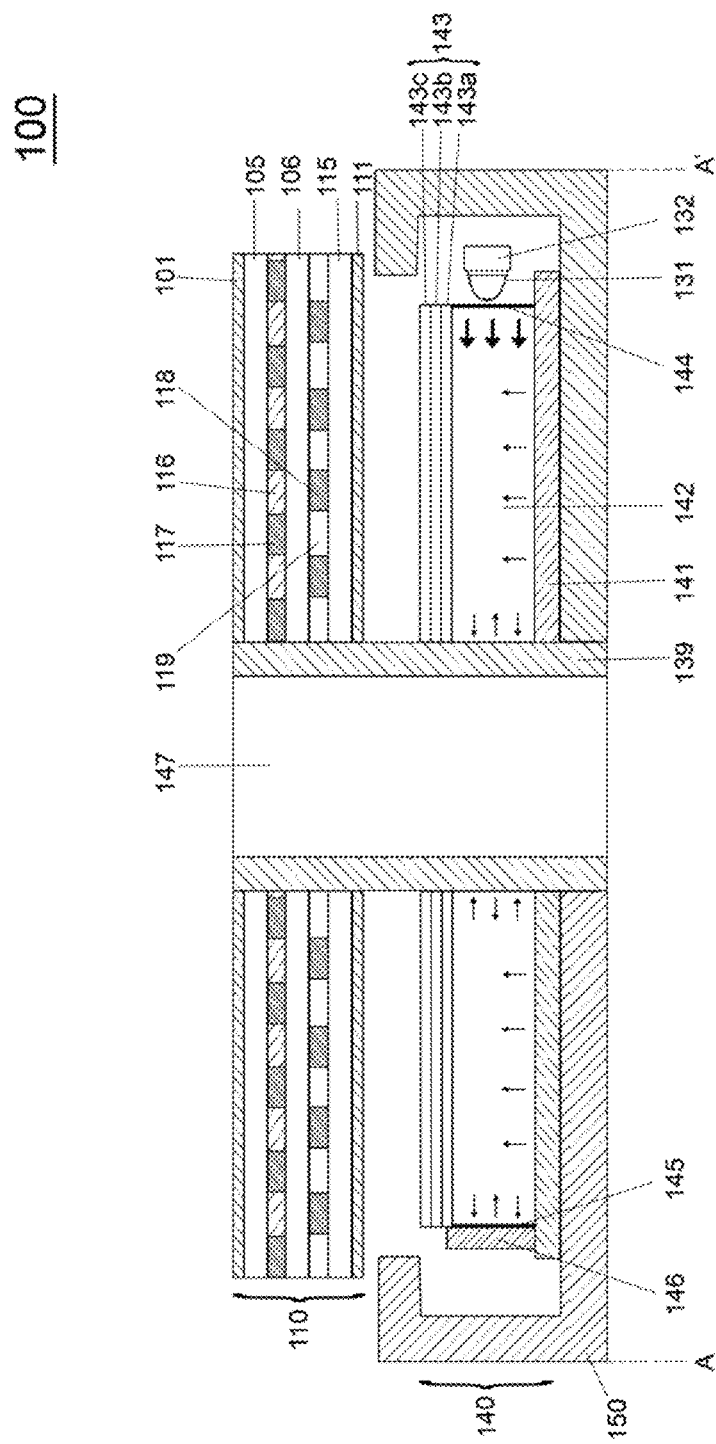
FIG. 8 is a simplified cross-sectional view schematically illustrating a cross section taken along line A-A' in FIG. 6.

As illustrated in FIG. 8, the light emitted by the plurality of light sources 131 enters the lateral surface of the first edge 144 of the light guide plate 142. The reflector tape 146 reflects light incident to the second edge 145 of the light guide plate 142 while the reflector band 139 reflects the light incident to the walls of the hole 147, preventing light from escaping through the walls of the hole 147. The reflector sheet 141 reflects light incident to its surface and redirects it towards the front surface of the light guide plate 142 and to the optical sheets 143 and finally towards the polarizer 111 and the liquid crystal panel 110.

The plurality of light sources 131 includes a printed circuit board (PCB) (not shown) for driving the same, and a housing 132. The plurality of light sources 131 may be composed of LEDs or other point sources of light that may be arranged in a linear array. The array of light sources 131 is not necessarily arranged in a straight line but may also be placed along a curved edge of the light guide plate 142. As illustrated in FIG. 7, the plurality of light sources 131 may be said to counter to the edge of the light guide plate.

As illustrated in FIG. 8, the plurality of light sources 131 are directed towards the lateral surface of the first edge 144 of the light guide plate 142 and the light emitted by them enters the said lateral surface of the first edge 144 of the light guide plate 142.

The backlight unit 140 having the foregoing structure is accommodated into the lower cover 150. However, the entire assembly may be fixed and housed in an appropriate manner wherein the edges of the display are held together to the appropriate clearances and with the proper fixtures.

The presence of the hole 147 creates a luminance difference between the front of the hole 147 and behind the hole 147 (F, R) in relation to the location of the plurality of light sources 131. The region behind the hole 147 has lower luminance because the light emitted by the plurality of light sources 131 are partially blocked by the hole 147. This luminance difference causes the light emitted by the backlight unit 140 on the liquid crystal panel 110 to be uneven, thus, resulting in lower image quality of the LCD device 100.

Figure 9A:
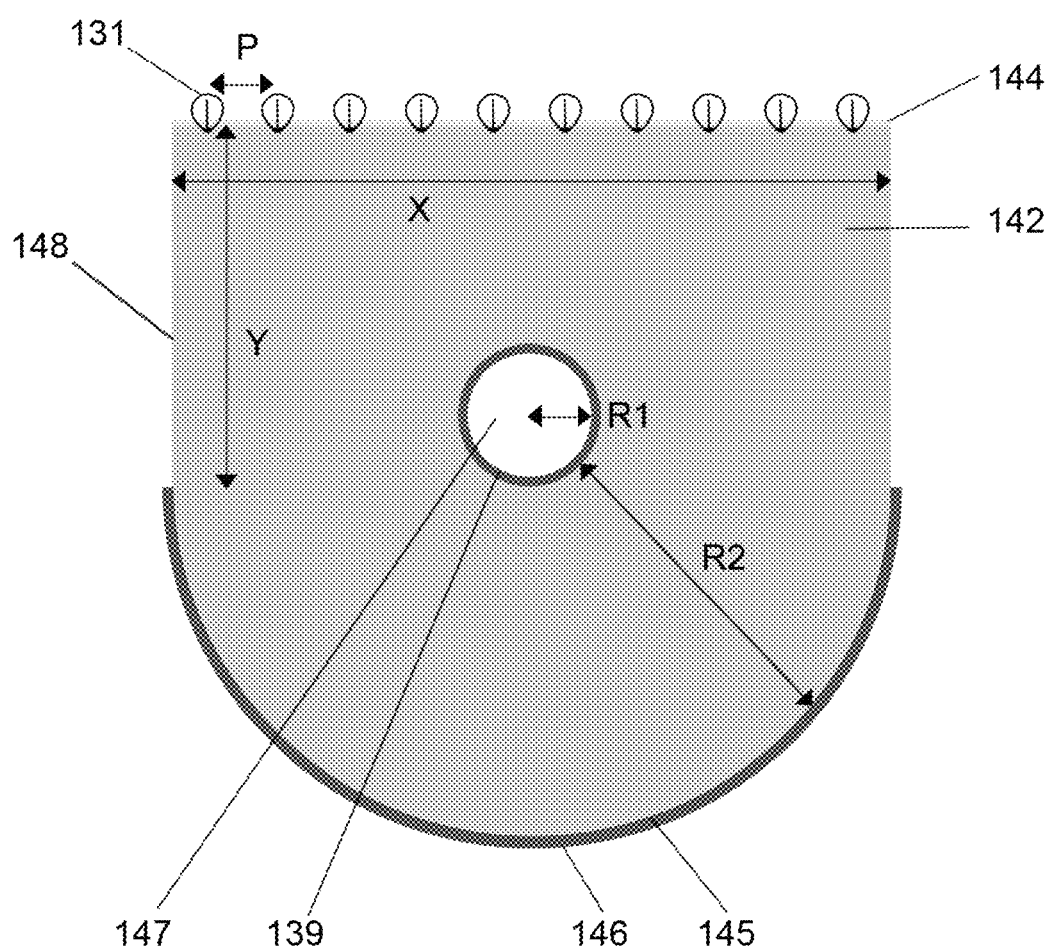
FIG. 9A is a plan view of a sample configuration of a backlight unit of the display device according to the embodiments of the present disclosure.
Figure 9B:
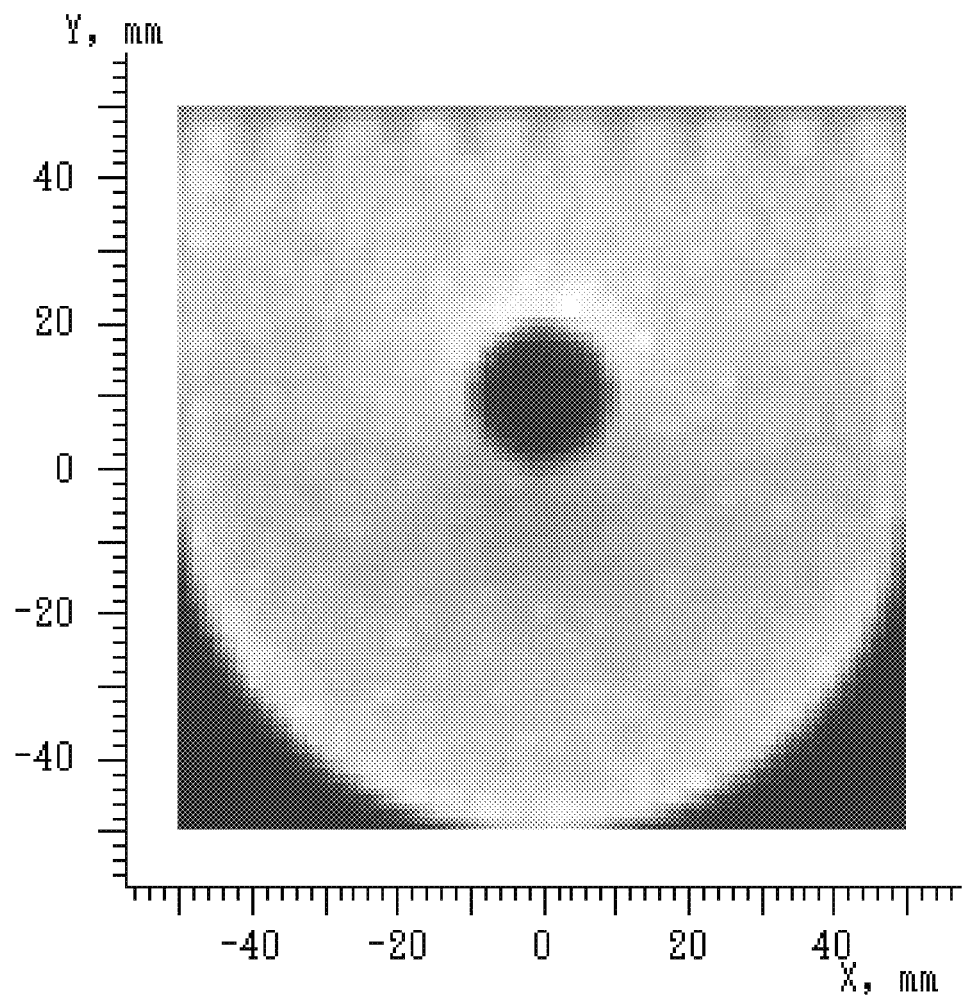
FIG. 9B presents the simplified simulation results showing the luminance distribution in the light guide plate in accordance with the configuration in FIG. 9A.

FIG. 9B presents the simplified simulation results of the luminance distribution in the light guide plate in accordance with the configuration and measurement indicated in FIG. 9A. The simulation has been performed by Light Tools™. In this simulation, the distances between adjacent light sources of the plurality of light sources 131 are equal and their respective centermost light rays are normal to the first edge 144 of the light guide plate 142. As shown in FIG. 9A, the light guide plate 142 is a combination of a rectangular shape and a semicircle shape. The first edge 144 of the rectangular shape is X (X=100 mm in this simulation) and a third edge 148 of the rectangular shape is Y (Y=50 mm in this simulation), the radius of the hole 147 is R1 (R1=10 mm in this simulation). The second edge 145 is the semicircle shape with a radius of R2 (R2=50 mm in this simulation) measured from the circumference of the hole 147. There are ten (10) light sources along the first edge 144 equally spaced at P (P=10 mm in this simulation). The light guide plate 142 is made of PMMA with a reflective index of 1.49 and has a rear surface of backlight pattern optimization. The plurality of light sources 131 are light emitting diodes emitting light in a Lambertian distribution.

This configuration results to a luminance ratio of 0.56, which is the luminance at front of the hole 147 divided by the luminance behind the hole 147, (See FIG. 17) as an example of comparison embodiment. The luminance ratio becomes 1 when the luminance distribution is ideally uniform.

Figure 10A:
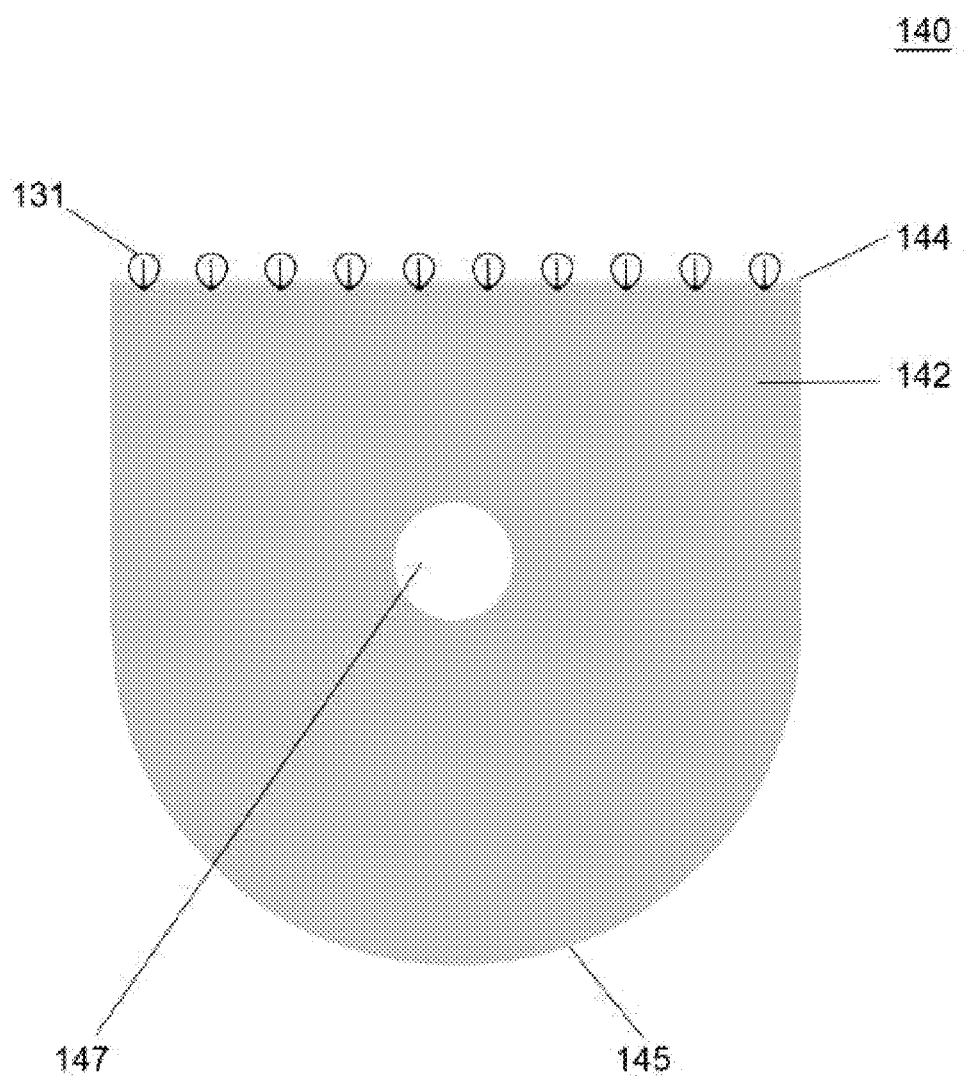
FIG. 10A is a plan view of a sample configuration of a backlight unit of the display device according to the embodiments of the present disclosure but without the reflector tape and the reflector band.
Figure 10B:
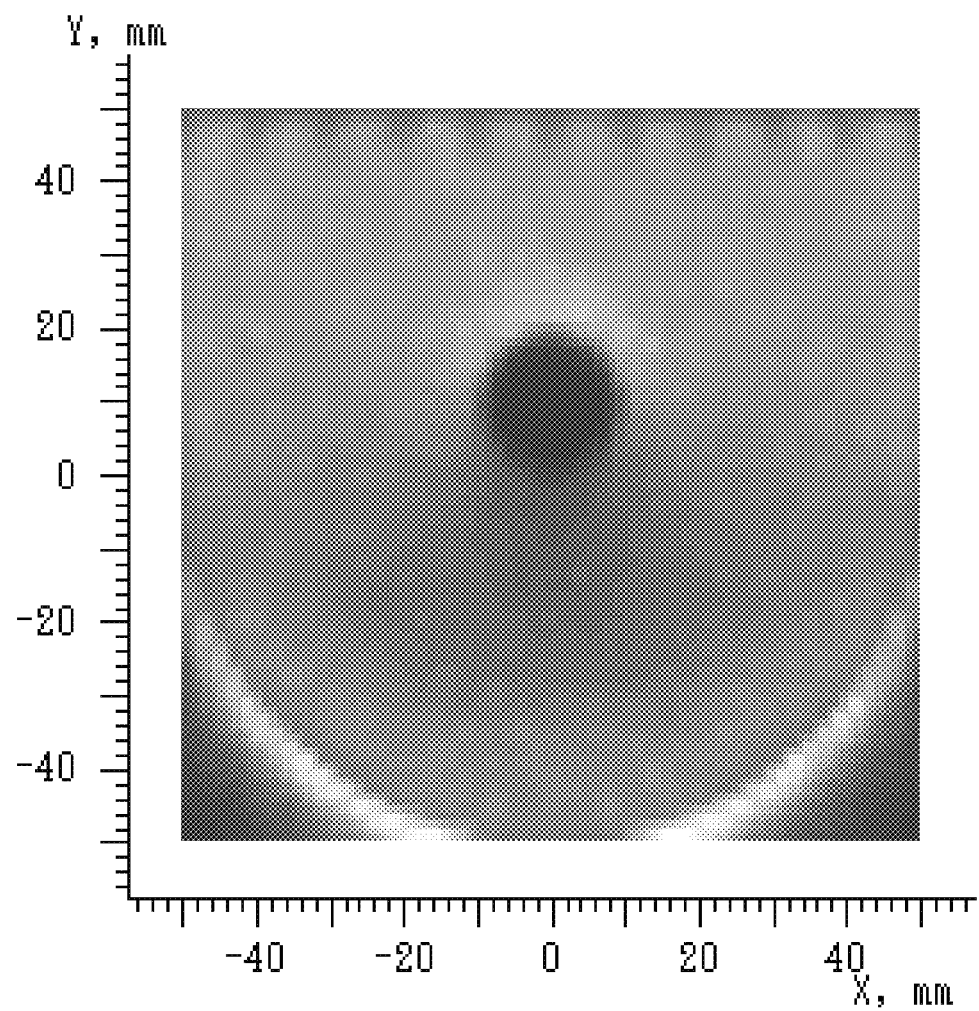
FIG. 10B presents the simplified simulation results showing the luminance distribution in the light guide plate in accordance with the configuration in FIG. 9A.

The luminance difference between the front of the hole 147 and behind the hole 147 is further aggravated when the reflector tape 146 located on a second edge 145 of the light guide plate 142 opposite to the first edge 144 and the reflector band 139 are removed (see FIG. 10A). FIG. 10B presents the simplified simulation results of the luminance distribution in the light guide plate of the backlight unit having the same configuration as FIG. 9A but without the reflector tape and the reflector band. As indicated in FIG. 17, the luminance ratio of such configuration becomes undefined.

While the reflector tape and the reflector band mitigate the luminance difference between the front of the hole and behind the hole, there is a need to further reduce the luminance difference to improve the image quality of the display device. To address this problem, different embodiments of the backlight unit are disclosed by the present disclosure.

While the figures illustrating the different embodiments of the present disclosure show only a single hole, the present invention also covers display devices with multiple holes. As such, the distance between the plurality of light sources and the hole, as referred to in the different embodiments, must be construed in the context of the hole being referenced if there are multiple holes.

First Embodiment

Figure 11A:
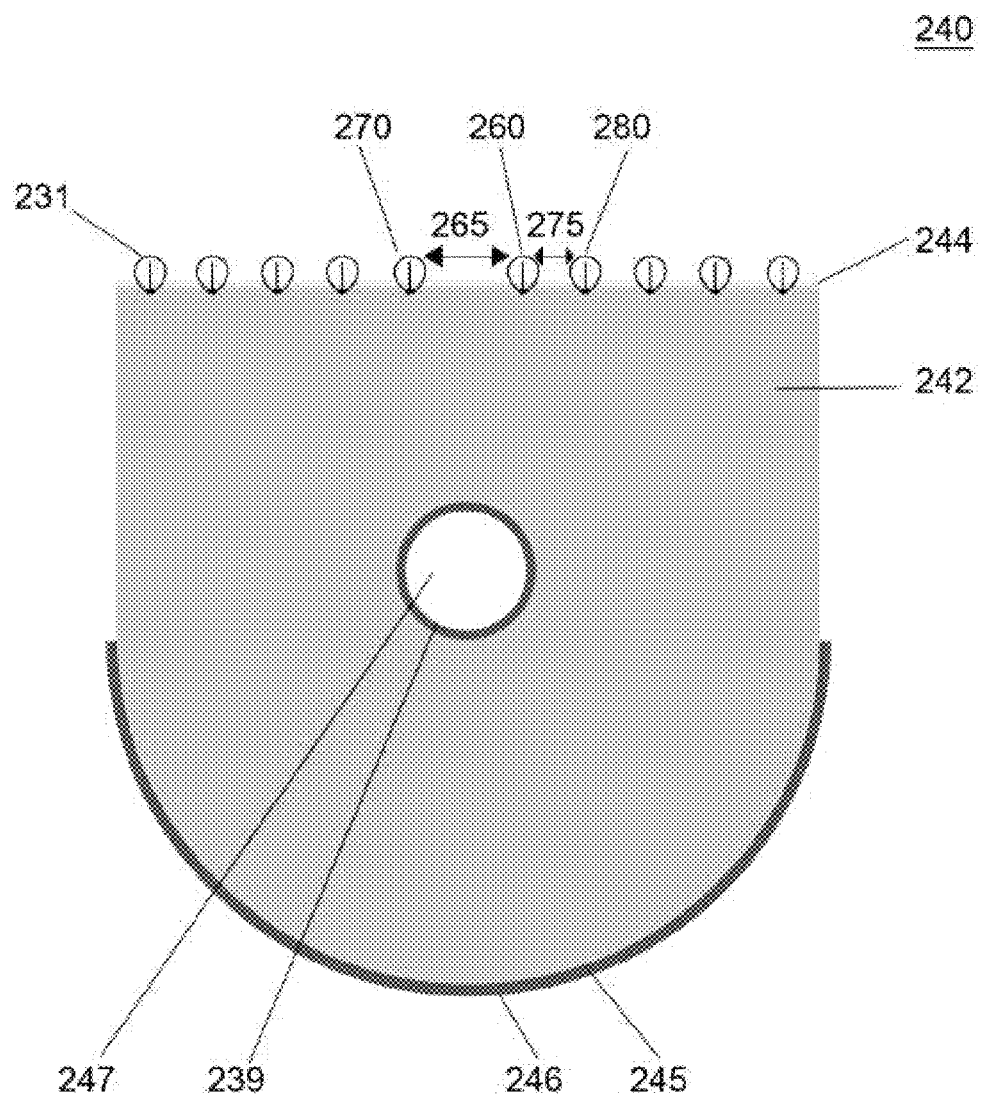
FIG. 11A is a plan view schematically illustrating the backlight unit according to a first embodiment of the present disclosure.

FIG. 11A is a plan view schematically illustrating a backlight unit 240 of a display device according to the first embodiment of the present disclosure.

The backlight unit 240 according to the first embodiment of the present disclosure may be comprised of a light guide plate 242 with hole 247 in plan view; a plurality of light sources 231 in a linear array along a first edge 244 of the light guide plate 242; and a reflector tape 246 on a second edge 245 of the light guide plate 242 opposite to the first edge 244.

The hole 247 may be filled with a material having a light transmittance different from a light transmittance of the light guide plate 242.

The backlight unit 240 may be further comprised of a reflector sheet (not shown) on a rear surface of the light guide plate 242 and a reflector band 239 around the inner periphery of the hole 247.

The light emitted by the plurality of light sources 231 enters the lateral surface of the first edge 244 of the light guide plate 242. The reflector tape 246 reflects the light incident to the second edge 245 of the light guide plate 242 while the reflector band 239 reflects the light incident to the walls of the hole 247, preventing light from escaping through the walls of the hole 247. The reflector sheet reflects the light transmitted through the rear surface of the light guide plate 242 to the upper surface thereof towards the liquid crystal panel.

The plurality of light sources 231 may be comprised of a first light source 260 being adjacent to both a second light source 270 and a third light source 280.

The first light source 260 is the light source being located with shortest distance from the hole 247 among the plurality of light sources 231. As shown in FIG. 11A, a distance between the hole 247 and the first light source 260 may be same as a distance between the hole 247 and the second light source 270.

The second light source 270 is the adjacent light source of the first light source 260 with a shorter or equal distance from the hole 247 than that of the third light source 280, the other adjacent light source.

According to the first embodiment of the present disclosure, a first distance 265 between the first light source 260 and the second light source 270 may be different from a second distance 275 between the first light source 260 and the third light source 280. In particular, the first distance 265 is greater than the second distance 275.

Figure 11B:
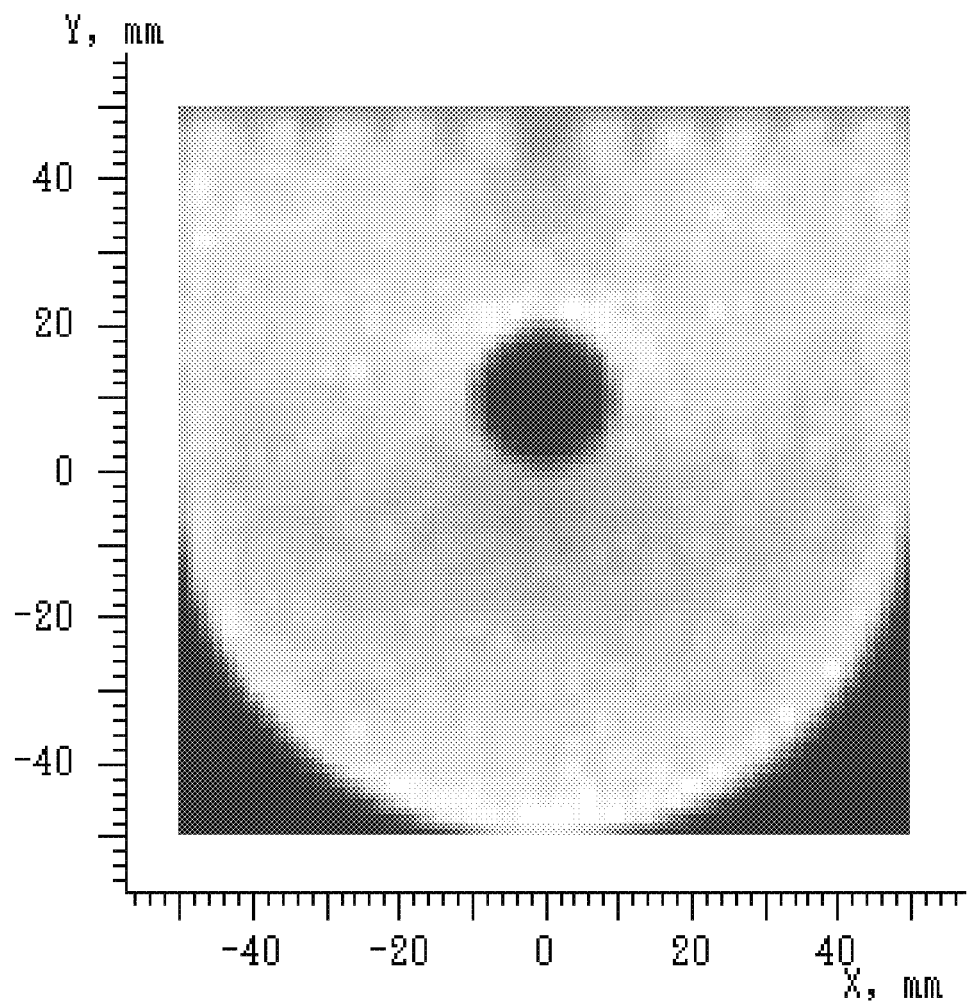
FIG. 11B presents the simplified simulation results showing the luminance distribution in the light guide plate according to a first embodiment of the present disclosure.

FIG. 11B presents the simplified simulation results of the luminance distribution in the light guide plate 242 using the backlight unit 240 according to the first embodiment of the present disclosure. The configuration and measurement used in the simulation is similar to that of FIG. 9A except that the first distance 265 is 16 mm while the other adjacent light sources are equally spaced at 8 mm.

The simulation results of the simulation show that the luminance difference between the front of the hole 247 and behind the hole 247 has been reduced. Correspondingly, the luminance ratio has increased to 0.64 (See FIG. 17).

In the present embodiment, the greater first distance 265 between the first light source 260 and the second light source 270 reduces the concentration of light rays at the front of the hole 247. Hence, the luminance difference between the front of the hole 247 and behind the hole 247 is also reduced.

Second Embodiment

Figure 12A:
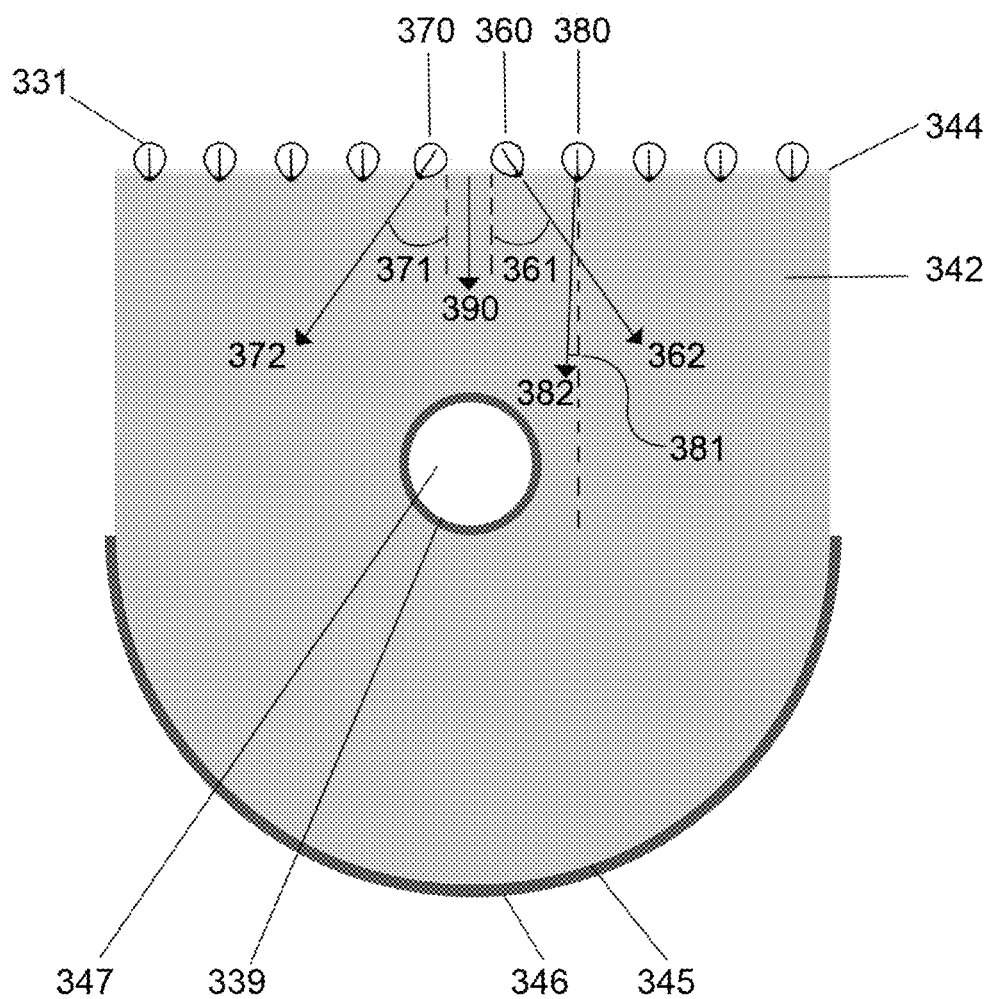
FIG. 12A is a plan view schematically illustrating the backlight unit according to a second embodiment of the present disclosure.

FIG. 12A is a plan view schematically illustrating a backlight unit 340 of a display device according to the second embodiment of the present disclosure.

The backlight unit 340 according to the second embodiment of the present disclosure may be comprised of a light guide plate 342 with hole 347 in plan view; a plurality of light sources 331 in a linear array along a first edge 344 of the light guide plate 342; and a reflector tape 346 on a second edge 345 of the light guide plate 342 opposite to the first edge 344.

The hole 347 may be filled with a material having a light transmittance different from a light transmittance of the light guide plate 342.

The backlight unit 340 may be further comprised of a reflector sheet (not shown) on a rear surface of the light guide plate 342 and a reflector band 339 around the inner periphery of the hole 347.

The light emitted by the plurality of light sources 331 enters the lateral surface of the first edge 344 of the light guide plate 342. The reflector tape 346 reflects the light incident to the second edge 345 of the light guide plate 342 while the reflector band 339 reflects the light incident to the walls of the hole 347, preventing light from escaping through the walls of the hole 347. The reflector sheet reflects the light transmitted through the rear surface of the light guide plate 342 to the upper surface thereof towards the liquid crystal panel.

The plurality of light sources 331 may be comprised of a first light source 360 being adjacent to both a second light source 370 and a third light source 380.

The first light source 360 is the light source being located with shortest distance from the hole 347 among the plurality of light sources 331. As shown in FIG. 12A, the distance between the hole 347 and the first light source 360 may be the same as the distance between the hole 347 and the second light source 370.

The second light source 370 is the adjacent light source of the first light source 360 with a shorter or equal distance from the hole 347 than that of the third light source 380, the other adjacent light source.

According to the second embodiment of the present disclosure, a first light ray angle 361 between a line 390 normal to the first edge 344 and a first centermost light ray 362 of the first light source 360, and a second light ray angle 371 between the line 390 and a second centermost light ray 372 of the second light source 370 may be both more than 5 degrees, and a third light ray angle 381 between the line 390 and a third centermost light ray 382 of the third light source 380 may be less than 2 degrees. In particular, both the first light ray angle 361 and the second light ray angle 371 are more than 10 degrees and less than 50 degrees.

In the present embodiment, the first centermost light ray 362 and the second centermost light ray 372 do not cross each other.

Figure 12B:
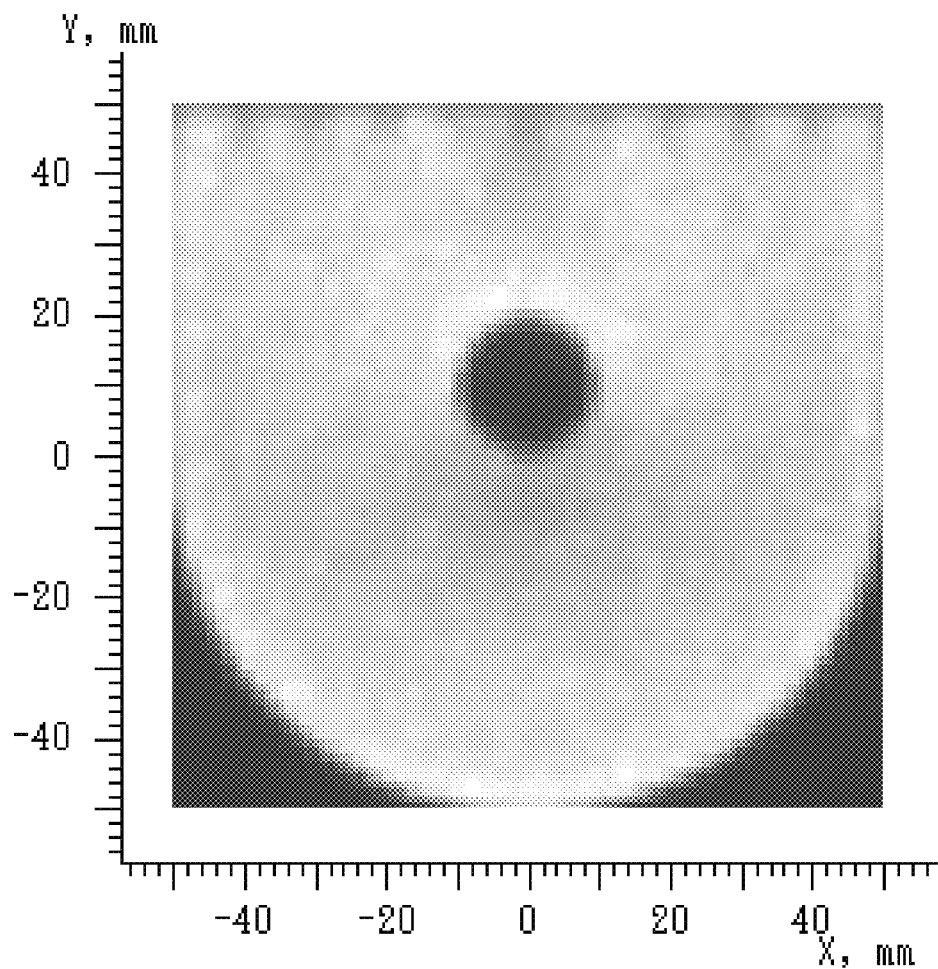
FIG. 12B presents the simplified simulation results showing the luminance distribution in the light guide plate according to a second embodiment of the present disclosure.

FIG. 12B presents the simplified simulation results of the luminance distribution in the light guide plate 342 using the backlight unit 340 according to the second embodiment of the present disclosure, wherein both the first light ray angle 361 and the second light ray angle 371 are 30 degrees. The configuration and measurement used in the simulation is similar to that of FIG. 9A except that both the first light ray angle 361 and the second light ray angle 371 are 30 degrees.

The simulation results show that the luminance difference between the front of the hole 347 and behind the hole 347 has been reduced. Correspondingly, the luminance ratio has increased to 0.64 (See FIG. 17).

In the present embodiment, the distances between adjacent light sources of the plurality of light sources 331 are equal but the first light source 360 and the second light source 370, which are the light sources closest to the hole 347, are angled in such a way that their respective first centermost light ray 362 and the second centermost light ray 372 do not cross each other. This configuration reduces the concentration of light rays at the front of the hole 347 and directs the light rays towards other regions with lower luminance. This serves a dual purpose of decreasing the luminance at the front of the hole 347 while enhancing the uniformity in other regions. Hence, the luminance difference between the front of the hole 347 and behind the hole 347 is reduced.

Third Embodiment

Figure 13A:
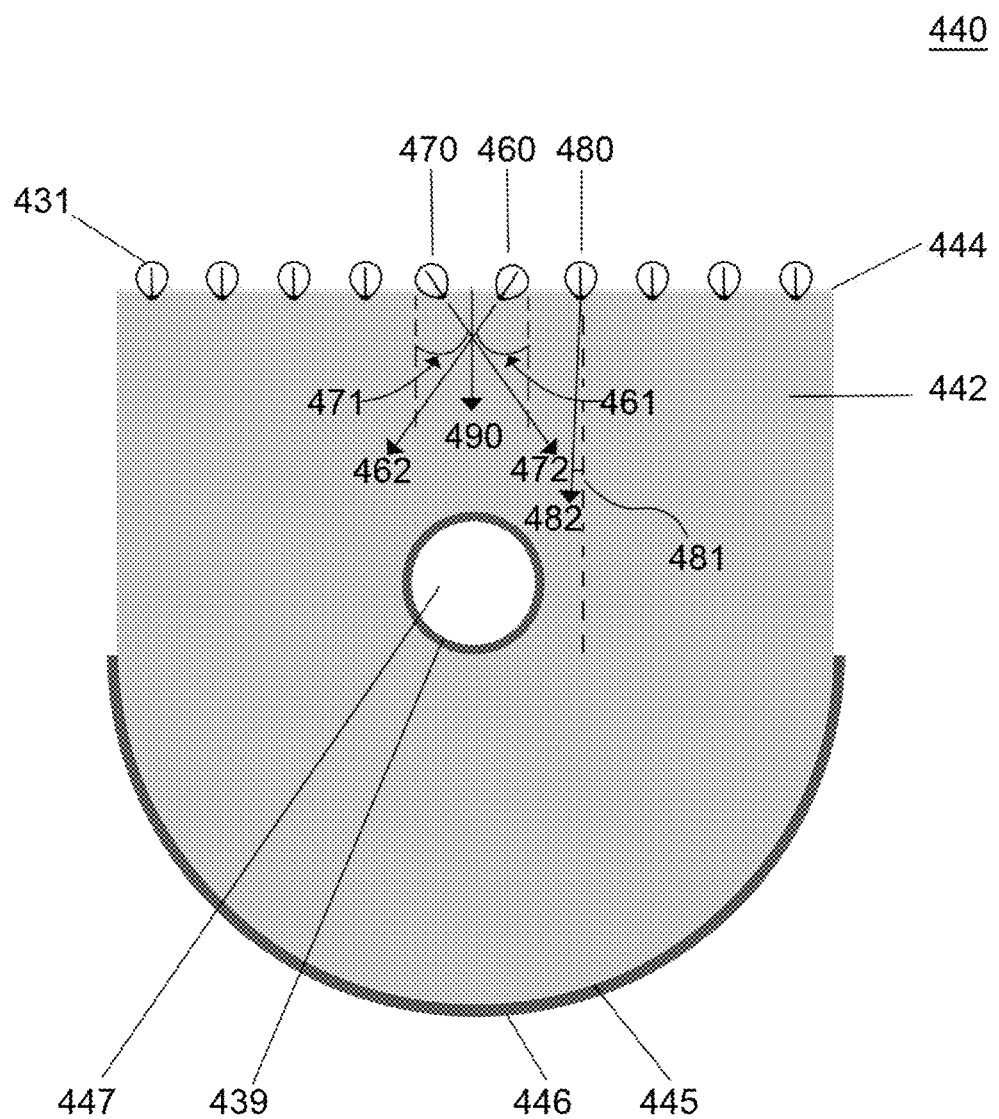
FIG. 13A is a plan view schematically illustrating the backlight unit according to a third embodiment of the present disclosure.

FIG. 13A is a plan view schematically illustrating a backlight unit 440 of a display device according to the third embodiment of the present disclosure.

The backlight unit 440 according to the third embodiment of the present disclosure may be comprised of a light guide plate 442 with hole 447 in plan view; a plurality of light sources 431 in a linear array along a first edge 444 of the light guide plate 442; and a reflector tape 446 on a second edge 445 of the light guide 442 plate opposite to the first edge 444.

The hole 447 may be filled with a material having a light transmittance different from a light transmittance of the light guide plate 442.

The backlight unit 440 may be further comprised of a reflector sheet (not shown) on a rear surface of the light guide plate 442 and a reflector band 439 around the inner periphery of the hole 447.

The light emitted by the plurality of light sources 431 enters the lateral surface of the first edge 444 of the light guide plate 442. The reflector tape 446 reflects the light incident to the second edge 445 of the light guide plate 442 while the reflector band 439 reflects the light incident to the walls of the hole 447, preventing light from escaping through the walls of the hole 447. The reflector sheet reflects the light transmitted through the rear surface of the light guide plate 442 to the upper surface thereof towards the liquid crystal panel.

The plurality of light sources 431 may be comprised of a first light source 460 being adjacent to both a second light source 470 and a third light source 480.

The first light source 460 is the light source being located with shortest distance from the hole 447 among the plurality of light sources 431. As shown in FIG. 13A, the distance between the hole 447 and the first light source 460 may be the same as the distance between the hole 447 and the second light source 470.

The second light source 470 is the adjacent light source of the first light source 460 with a shorter or equal distance from the hole 447 than that of the third light source 480, the other adjacent light source.

According to the third embodiment of the present disclosure, a first light ray angle 461 between a line 490 normal to the first edge 444 and a first centermost light ray 462 of the first light source 460, and a second light ray angle 471 between the line 490 and a second centermost light ray 472 of the second light source 470 may be both more than 5 degrees, and a third light ray angle 481 between the line 490 and a third centermost light ray 482 of the third light source 480 may be less than 2 degrees. In particular, both the first light ray angle 461 and the second light ray angle 471 are more than 10 degrees and less than 50 degrees.

In the present embodiment, the first centermost light ray 462 and the second centermost light ray 472 cross each other.

Figure 13B:
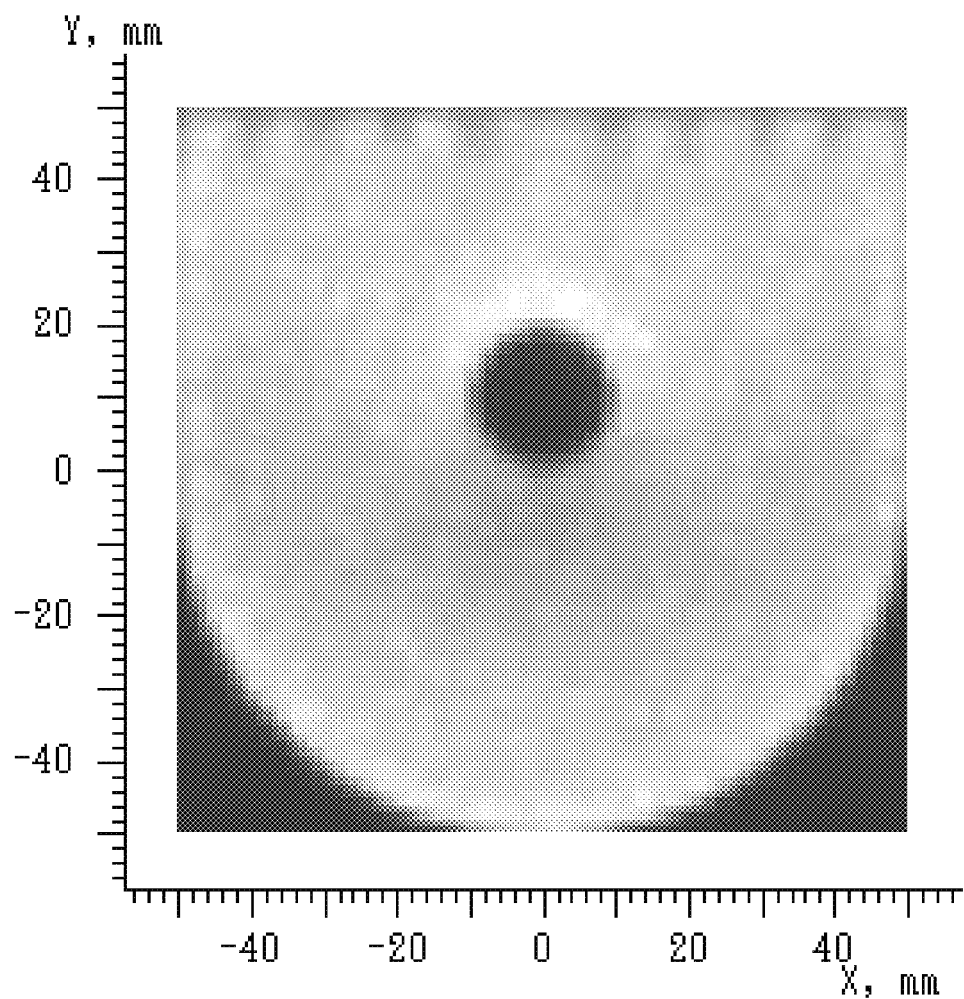
FIG. 13B presents the simplified simulation results showing the luminance distribution in the light guide plate according to a third embodiment of the present disclosure.

FIG. 13B presents the simplified simulation results of the luminance distribution in the light guide plate 442 using the backlight unit 440 according to the third embodiment of the present disclosure, wherein both the first light ray angle 461 and the second light ray angle 471 are at 30 degrees. The configuration and measurement used in the simulation is similar to that of FIG. 9A except that both the first light ray angle 461 and the second light ray angle 471 are 30 degrees and the first centermost light ray 462 and the second centermost light ray 472 cross each other The simulation results show that the luminance difference between the front of the hole 447 and behind the hole 447 has been reduced. Correspondingly, the luminance ratio has increased to 0.57 (See FIG. 17).

In the present embodiment, the distances between adjacent light sources of the plurality of light sources 431 are equal but the first light source 460 and the second light source 470, which are the light sources closest to the hole 447, are angled in such a way that their respective first centermost light ray 462 and the second centermost light ray 472 cross each other but do not strike the hole 447. This configuration reduces the concentration of light rays at the front of the hole 447 and directs the light rays towards other regions with lower luminance. This serves a dual purpose of decreasing the luminance at the front of the hole 447 while enhancing the uniformity in other regions. Hence, the luminance difference between the front of the hole 447 and behind the hole 447 is reduced.

Fourth Embodiment

Figure 14A:
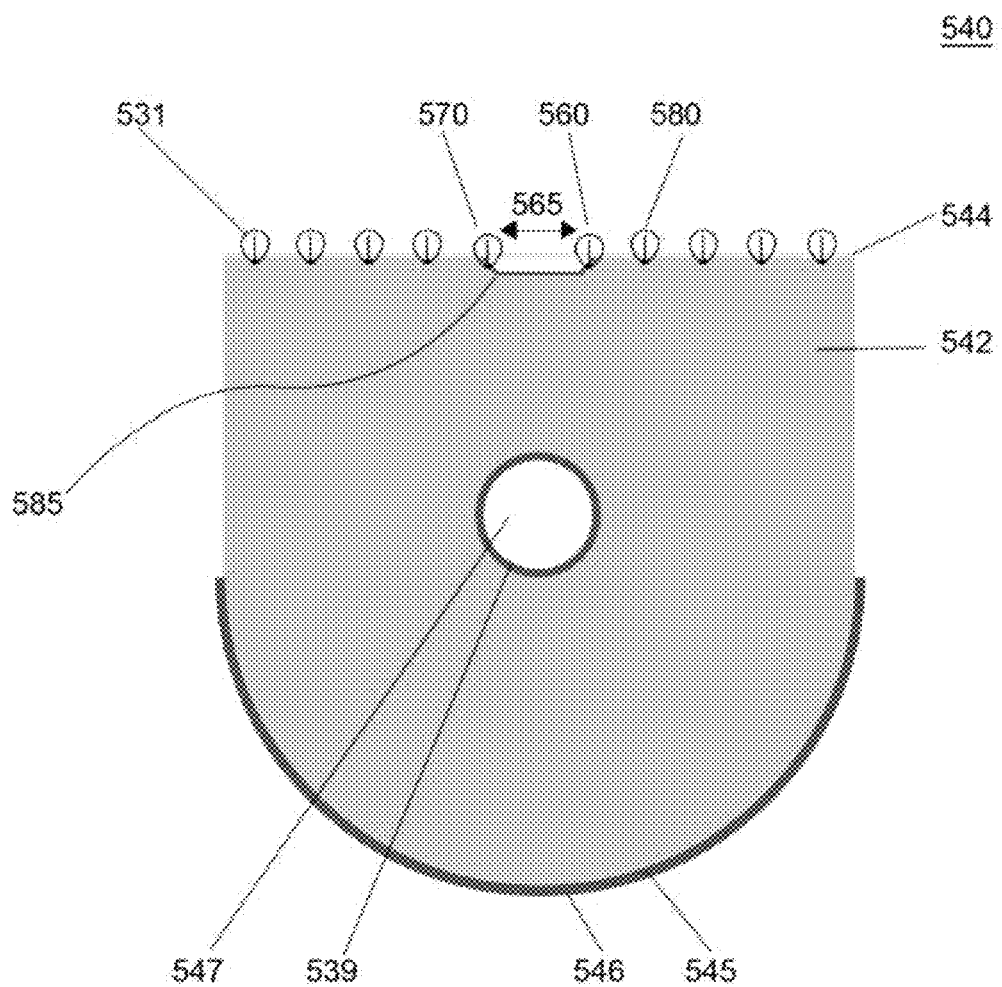
FIG. 14A is a plan view schematically illustrating the backlight unit according to a fourth embodiment of the present disclosure.

FIG. 14A is a plan view schematically illustrating a backlight unit 540 of a display device according to the fourth embodiment of the present disclosure.

The backlight unit 540 according to the fourth embodiment of the present disclosure may be comprised of a light guide plate 542 with hole 547 in plan view; a plurality of light sources 531 in a linear array along a first edge 544 of the light guide plate 542; and a reflector tape 546 on a second edge 545 of the light guide plate 542 opposite to the first edge 544.

The hole 547 may be filled with a material having a light transmittance different from a light transmittance of the light guide plate 542.

The backlight unit 540 may be further comprised of a reflector sheet (not shown) on a rear surface of the light guide plate 542 and a reflector band 539 around the inner periphery of the hole 547.

The light emitted by the plurality of light sources 531 enters the lateral surface of the first edge 544 of the light guide plate 542. The reflector tape 546 reflects the light incident to the second edge 545 of the light guide plate 542 while the reflector band 539 reflects the light incident to the walls of the hole 547, preventing light from escaping through the walls of the hole 547. The reflector sheet reflects the light transmitted through the rear surface of the light guide plate 542 to the upper surface thereof towards the liquid crystal panel.

The plurality of light sources 531 may be comprised of a first light source 560 being adjacent to both a second light source 570 and a third light source 580.

The first light source 560 is the light source being located with shortest distance from the hole 547 among the plurality of light sources 531. As shown in FIG. 14A, the distance between the hole 547 and the first light source 560 may be the same as the distance between the hole 547 and the second light source 570.

The second light source 570 is the adjacent light source of the first light source 560 with a shorter or equal distance from the hole 547 than that of the third light source 580, the other adjacent light source.

According to the fourth embodiment of the present disclosure, the first edge 544 may have one cutout section 585, a midpoint in width of the cutout section 585 being located between the first light source 560 and the second light source 570. In particular, the width of the cutout section 585 is greater than a first distance 565 between the first light source 560 and the second light source 570.

In the present embodiment, the first light source 560 and the second light source 570 both counter the cutout section 585 while the third light source 580 counters the first edge 544 other than the cutout section 585 (See FIG. 14A). The respective centermost light rays of the plurality of light sources 531 are normal to the first edge 544.

Figure 14B:
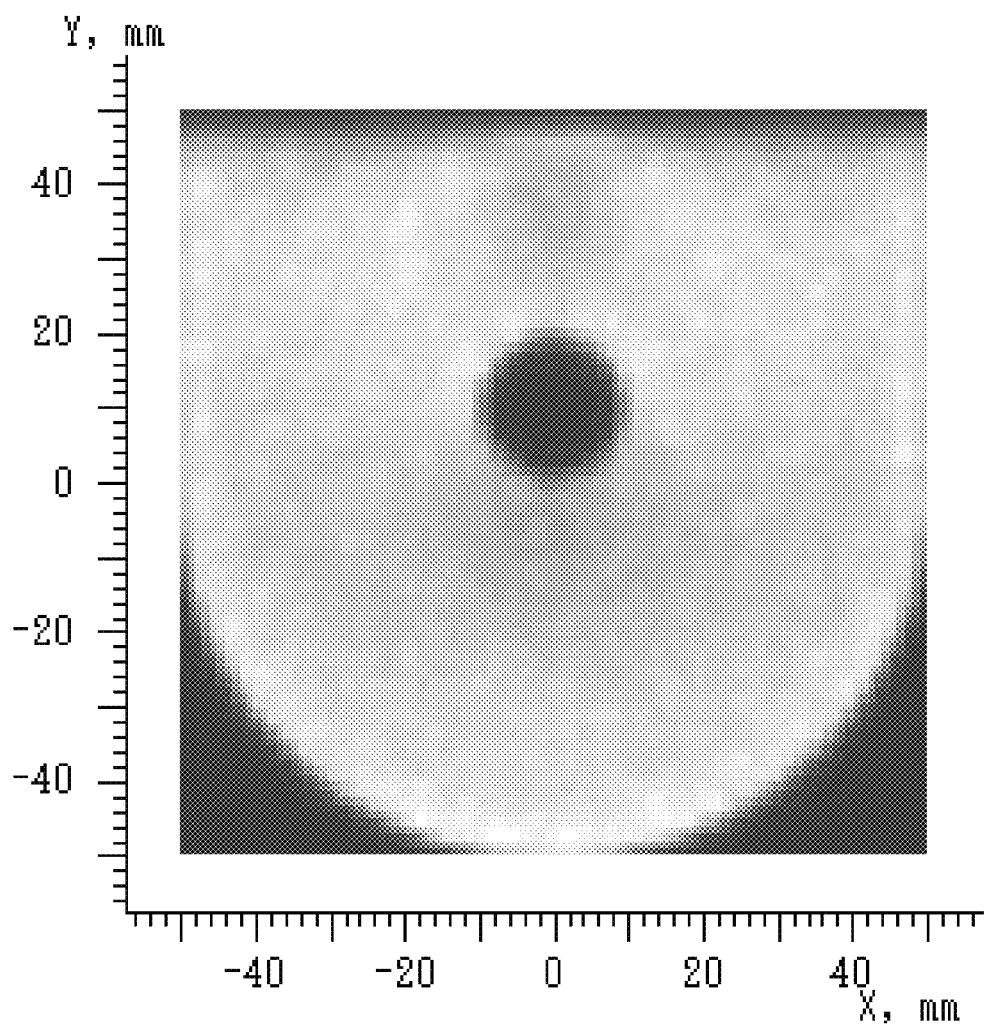
FIG. 14B presents the simplified simulation results showing the luminance distribution in the light guide plate according to a fourth embodiment of the present disclosure.

FIG. 14B presents the simplified simulation results of the luminance distribution in the light guide plate 542 using the backlight unit 540 according to the fourth embodiment of the present disclosure, wherein the first edge 544 has one cutout section 585 with a width greater than the first distance 565. The configuration and measurement used in the simulation is similar to that of FIG. 9A except for the presence of the cutout section 585.

The simulation results show that the luminance difference between the front of the hole 547 and behind the hole 547 has been significantly reduced. Correspondingly, the luminance ratio has increased to 0.71 (See FIG. 17).

In the present embodiment, the distances between adjacent light sources of the plurality of light sources 531 are equal and the respective centermost light rays of the plurality light sources 531 are normal to the first edge 544. The cutout section 585 partially deflects the light emitted by the first light source 560 and the second light source 570 away from the hole 547. As such, the concentration of the light rays at the front of the hole 547 is reduced. Hence, the luminance difference between the front of the hole 547 and behind the hole 547 is also reduced.

Fifth Embodiment

Figure 15A:
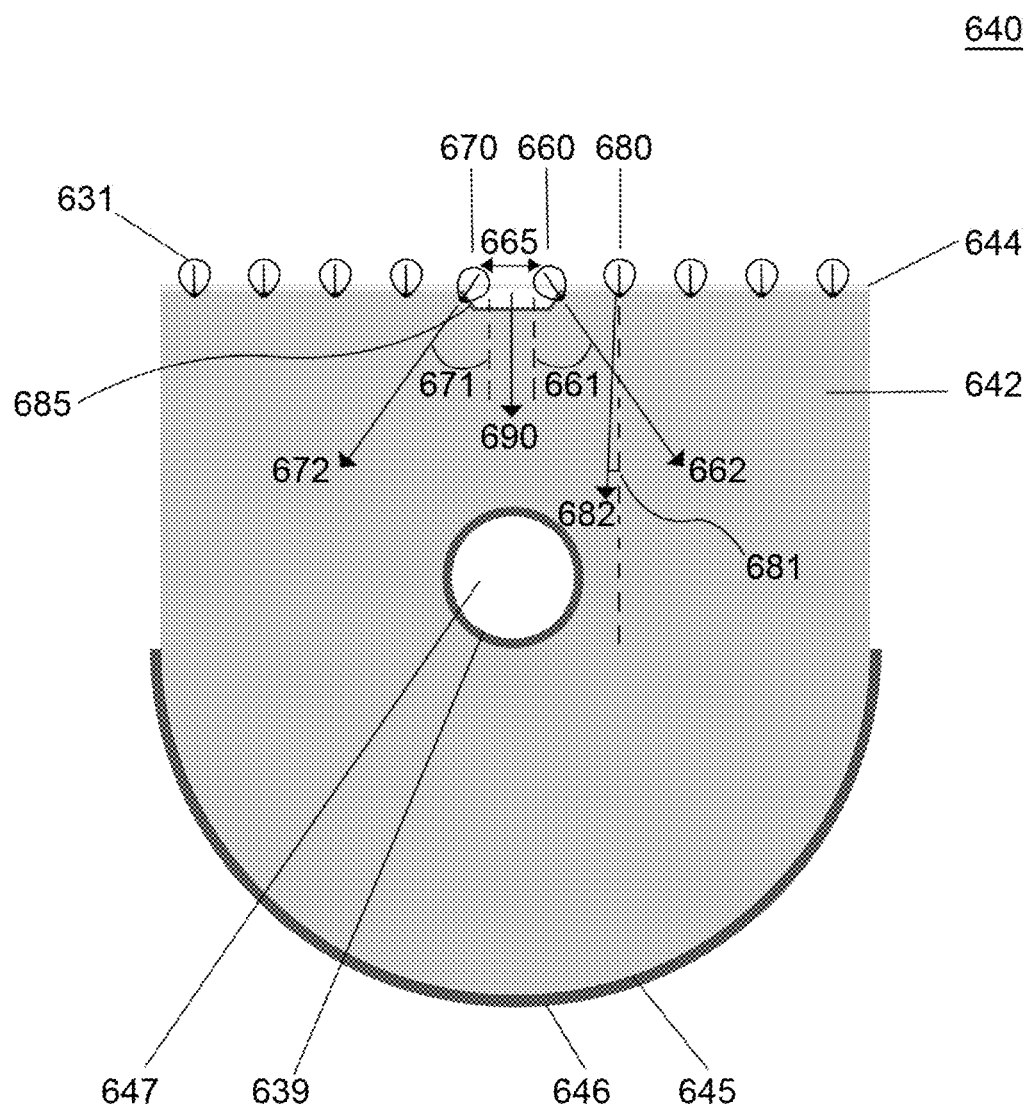
FIG. 15A is a plan view schematically illustrating the backlight unit according to a fifth embodiment of the present disclosure.

FIG. 15A is a plan view schematically illustrating a backlight unit 640 of a display device according to the fifth embodiment of the present disclosure.

The backlight unit 640 according to the fifth embodiment of the present disclosure may be comprised of a light guide plate 642 with hole 647 in plan view, a plurality of light sources 631 in a linear array along a first edge 644 of the light guide plate 642, and a reflector tape 646 on a second edge 645 of the light guide plate 642 opposite to the first edge 644.

The hole 647 may be filled with a material having a light transmittance different from a light transmittance of the light guide plate 642.

The backlight unit 640 may be further comprised of a reflector sheet (not shown) on a rear surface of the light guide plate 642 and a reflector band 639 around the inner periphery of the hole 647.

The light emitted by the plurality of light sources 631 enters the lateral surface of the first edge 644 of the light guide plate 642. The reflector tape 646 reflects the light incident to the second edge 645 of the light guide plate 642 while the reflector band 639 reflects the light incident to the walls of the hole 647, preventing light from escaping through the walls of the hole 647. The reflector sheet reflects the light transmitted through the rear surface of the light guide plate 642 to the upper surface thereof towards the liquid crystal panel.

The plurality of light sources 631 may be comprised of a first light source 660 being adjacent to both a second light source 670 and a third light source 680.

The first light source 660 is the light source being located with shortest distance from the hole 647 among the plurality of light sources 631. As shown in FIG. 15A, a distance between the hole 647 and the first light source 660 may be same as a distance between the hole 647 and the second light source 670.

The second light source 670 is the adjacent light source of the first light source 660 with a shorter or equal distance from the hole 647 than that of the third light source 680, the other adjacent light source.

According to the fifth embodiment of the present disclosure, the first edge 644 may have one cutout section 685, a midpoint in width of the cutout section 685 being located between the first light source 660 and the second light source 670. In particular, the width of the cutout section 685 is greater than a first distance 665 between the first light source 660 and the second light source 670.

Figure 15B:
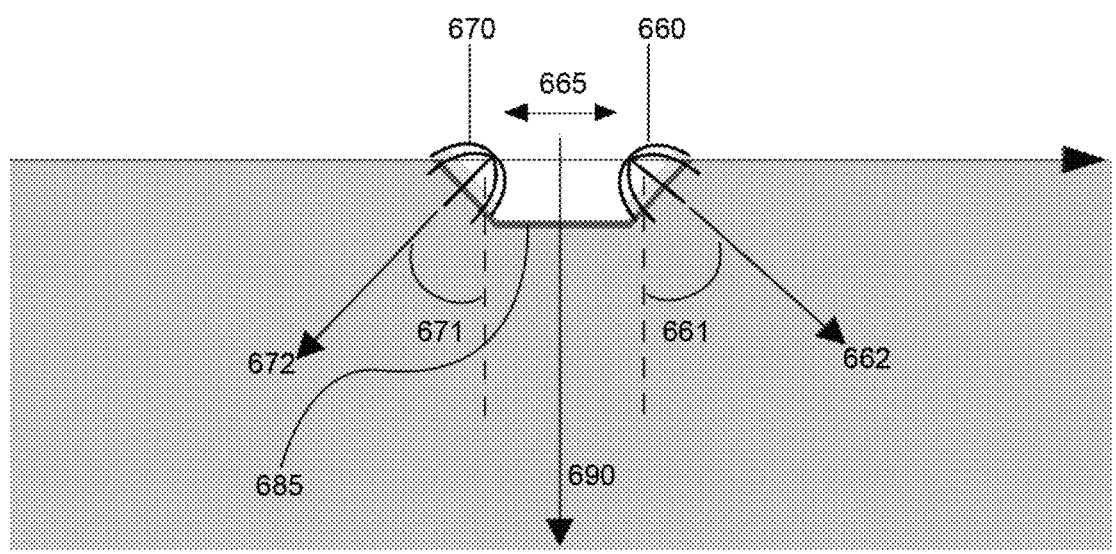
FIG. 15B is a magnified view of the cutout section area in FIG. 15A.

In the present embodiment, the first light source 660 and the second light source 670 both counter the cutout section 685 (See FIG. 15B) while the third light source 680 counters the first edge 644 other than the cutout section 685 (See FIG. 15A).

In the present embodiment, a first light ray angle 661 between a line 690 normal to the first edge 644 and a first centermost light ray 662 of the first light source 660, and a second light ray angle 671 between the line 690 and a second centermost light ray 672 of the second light source 670 may be both more than 5 degrees, and a third light ray angle 681 between the line 690 and a third centermost light ray 682 of the third light source 680 may be less than 2 degrees. In particular, both the first light ray angle 661 and the second light ray angle 671 are more than 10 degrees and less than 50 degrees.

Figure 15C:
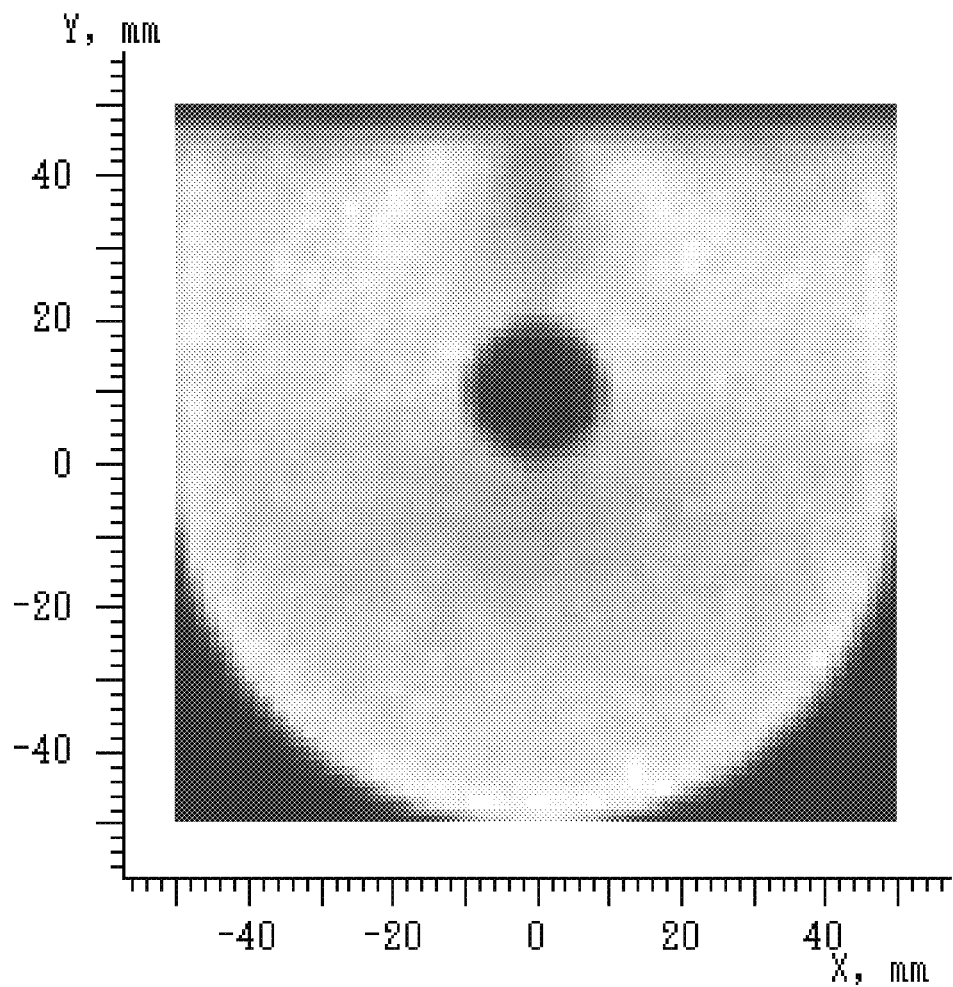
FIG. 15C presents the simplified simulation results showing the luminance distribution in the light guide plate according to a fifth embodiment of the present disclosure.

FIG. 15C presents the simplified simulation results of the luminance distribution in the light guide plate 642 using the backlight unit 640 according to the fifth embodiment of the present disclosure, wherein the first edge 644 has one cutout section 685 with a width greater than the first distance 665 and both the first light ray angle 661 and the second light ray angle 671 are 30 degrees. The configuration and measurement used in the simulation is similar to that of FIG. 9A except that there is the cutout section 685 and that both the first light ray angle 661 and the second light ray angle 671 are 30 degrees. The configuration of the fifth embodiment is a combination of those of the second and fourth embodiments.

The simulation results show that the luminance difference between the front of the hole 647 and behind the hole 647 has been significantly reduced. Correspondingly, the luminance ratio has increased to 0.77 (See FIG. 17).

In the present embodiment, the distances between adjacent light sources of the plurality of light sources 631 are equal but the first light source 660 and the second light source 670, which are the light sources closest to the hole 647, are angled in such a way that their respective first centermost light ray 662 and the second centermost light ray 672 do not cross each other. This configuration reduces the concentration of light rays at the front of the hole 647 and directs the light rays towards other regions with lower luminance. This serves a dual purpose of decreasing the luminance at the front of the hole 647 while enhancing the uniformity in other regions. In addition, the cutout section 685 partially deflects the light emitted by the first light source 660 and the second light source 670 away from the hole 647. As such, the concentration of the light rays at the front of the hole 647 is reduced. Hence, the luminance difference between the front of the hole 647 and behind the hole 647 is also reduced.

Sixth Embodiment

Figure 16A:
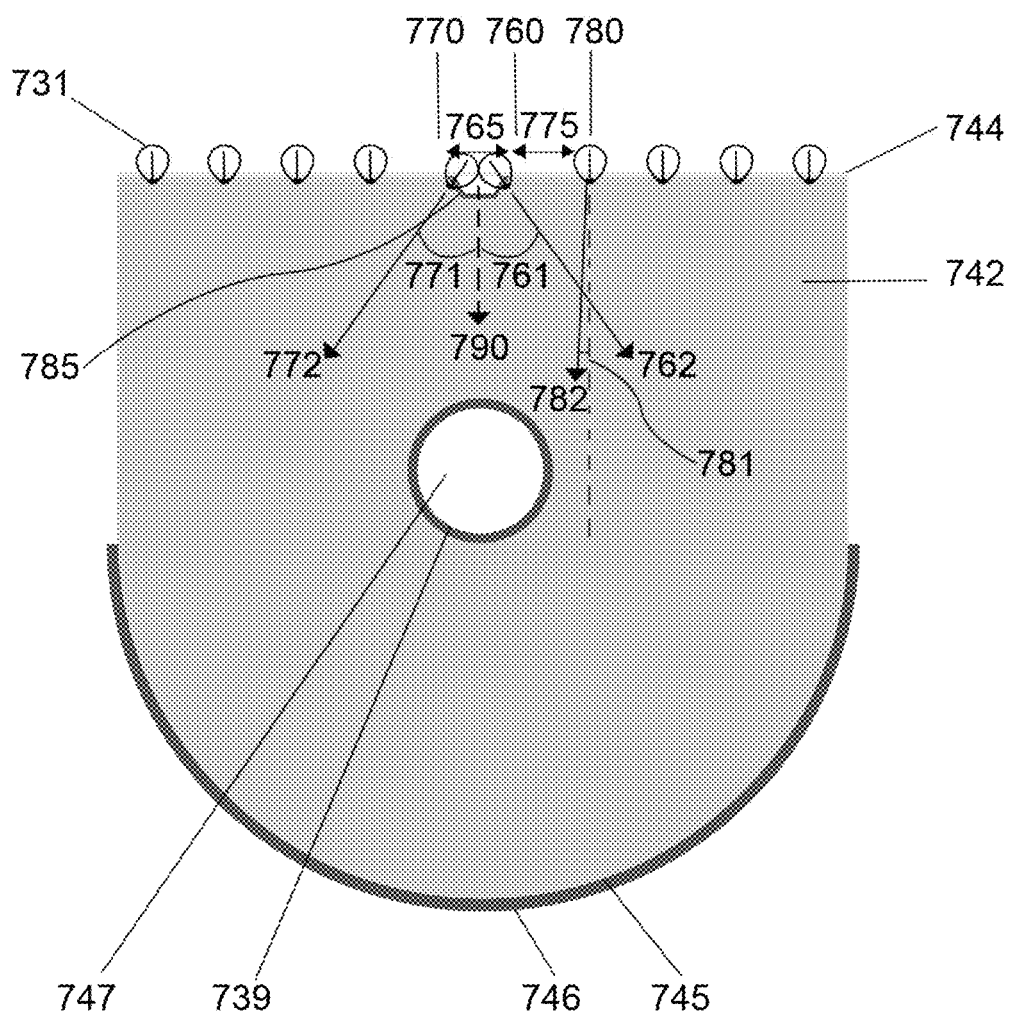
FIG. 16A is a plan view schematically illustrating the backlight unit according to a sixth embodiment of the present disclosure.

FIG. 16A is a plan view schematically illustrating a backlight unit 740 of a display device according to the sixth embodiment of the present disclosure.

The backlight unit 740 according to the sixth embodiment of the present disclosure may be comprised of a light guide plate 742 with hole 747 in plan view, a plurality of light sources 731 in a linear array along a first edge 744 of the light guide plate 742, and a reflector tape 746 on a second edge 745 of the light guide plate 742 opposite to the first edge 744.

The hole 747 may be filled with a material having a light transmittance different from a light transmittance of the light guide plate 742.

The backlight unit 740 may be further comprised of a reflector sheet (not shown) on a rear surface of the light guide plate 742 and a reflector band 739 around the inner periphery of the hole 747.

The light emitted by the plurality of light sources 731 enters the lateral surface of the first edge 744 of the light guide plate 742. The reflector tape 746 reflects the light incident to the second edge 745 of the light guide plate 742 while the reflector band 739 reflects the light incident to the walls of the hole 747, preventing light from escaping through the walls of the hole 747. The reflector sheet reflects the light transmitted through the rear surface of the light guide plate 742 to the upper surface thereof towards the liquid crystal panel.

The plurality of light sources 731 may be comprised of a first light source 760 being adjacent to both a second light source 770 and a third light source 780.

The first light source 760 is the light source being located with shortest distance from the hole 747 among the plurality of light sources 731. As shown in FIG. 16A, a distance between the hole 747 and the first light source 760 may be same as a distance between the hole 747 and the second light source 770.

The second light source 770 is the adjacent light source of the first light source 760 with a shorter or equal distance from the hole 747 than that of the third light source 780, the other adjacent light source.

According to the sixth embodiment of the present disclosure, the first edge 744 may have one cutout section 785, a midpoint in width of the cutout section 785 being located between the first light source 760 and the second light source 770. In particular, the width of the cutout section 785 is greater than a first distance 765 between the first light source 760 and the second light source 770.

Figure 16B:
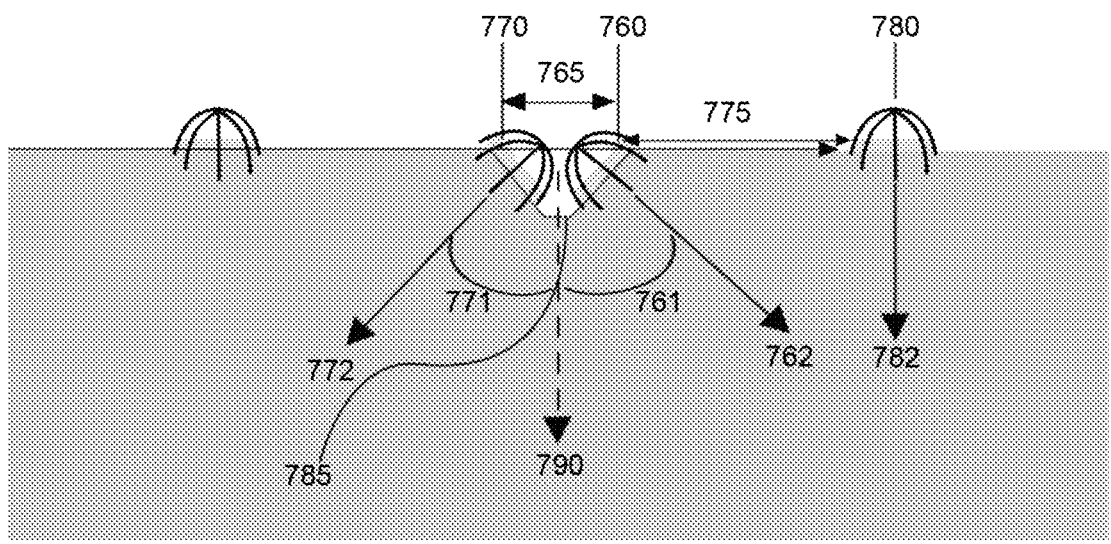
FIG. 16B is a magnified view of the cutout section area in FIG. 16A.

In the present embodiment, the first light source 760 and the second light source 770 both counter the cutout section 785 (See FIG. 16B) while the third light source 780 counters the first edge 744 other than the cutout section 785 (See FIG. 16A).

In the present embodiment, the first distance 765 between the first light source 760 and the second light source 770 may be shorter than a second distance 775 between the first light source 760 and the third light source 780.

In the present embodiment, a first light ray angle 761 between a line 790 normal to the first edge 744 and a first centermost light ray 762 of the first light source 760, and a second light ray angle 771 between the line 790 and a second centermost light ray 772 of the second light source 770 may be both more than 5 degrees, and a third light ray angle 781 between the line 790 and a third centermost light ray 782 of the third light source 780 may be less than 2 degrees. In particular, both the first light ray angle 761 and the second light ray angle 771 are more than 10 degrees and less than 50 degrees.

Figure 16C:
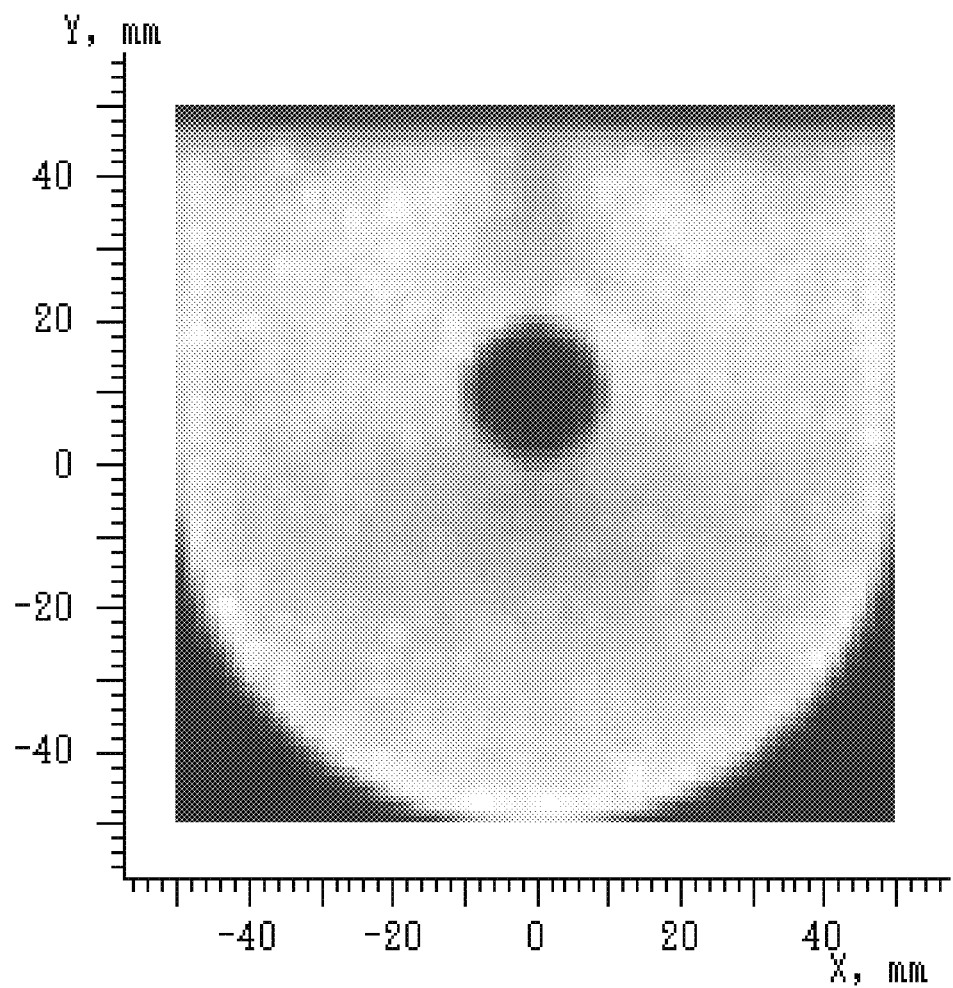
FIG. 16C presents the simplified simulation results showing the luminance distribution in the light guide plate according to a sixth embodiment of the present disclosure.

FIG. 16C presents the simplified simulation results of the luminance distribution in the light guide plate 742 using the backlight unit 740 according to the sixth embodiment of the present disclosure, wherein the first edge 744 has one cutout section 785 with a width greater than the first distance 765, said first distance 765 is 4 mm while the second distance 775 is 13 mm, and both the first light ray angle 761 and the second light ray angle 771 are 30 degrees. The configuration and measurement used in the simulation is similar to that of FIG. 9A except that there is the cutout section 685, that first distance 765 is shorter than the second distance 775, and that both the first light ray angle 761 and the second light ray angle 771 are 30 degrees.

The simulation results show that the luminance difference between the front of the hole 747 and behind the hole 747 has been significantly reduced. Correspondingly, the luminance ratio has increased to 0.72 (See FIG. 17).

In the present embodiment, while the first distance 765 is shorter the second distance 775, the first light source 760 and the second light source 770, which are the light sources closest to the hole 747, are angled in such a way that their respective first centermost light ray 762 and the second centermost light ray 772 do not cross each other. This configuration reduces the concentration of light rays at the front of the hole 747 and directs the light rays towards other regions with lower luminance. This serves a dual purpose of decreasing the luminance at the front of the hole 747 while enhancing the uniformity in other regions. In addition, the cutout section 785 partially deflects the light emitted by the first light source 760 and the second light source 770 away from the hole 747. As such, the concentration of the light rays at the front of the hole 747 is reduced. Hence, the luminance difference between the front of the hole 747 and behind the hole 747 is also reduced.

Although many subject matters have been specifically disclosed in the foregoing description, they should be construed as illustrations of various embodiments rather than a limitation to the scope of the present disclosure. The present disclosure should not be limited by the embodiments disclosed herein but should be determined by the claims and the equivalents thereof.

What is claimed is:

1. A backlight unit, comprising:
   a light guide plate with at least one hole in plan view;
   a plurality of light sources in a linear array along a first edge of the light guide plate; and
   a reflector tape on a second edge of the light guide plate opposite to the first edge;
   the plurality of light sources comprising:
   a first light source;
   a second light source; and
   a third light source;
   the first light source being located a shortest distance from the at least one hole among the plurality of light sources and being adjacent to both the second light source and the third light source;
   the second light source with a shorter or equal distance from the at least one hole than a distance of the third light source from the at least one hole;
   wherein the first edge has at least one cutout section, a midpoint in width of the at least one cutout section being located between the first light source and the second light source; and wherein the at least one cutout section includes a first inclined edge facing the first light source, a second inclined edge facing the second light source, and an intermediate edge disposed between the first inclined edge and the second inclined edge and being parallel with the first edge other than the at least one cutout section.

2. The backlight unit according to claim 1, wherein a width of the cutout section is greater than a distance between the first light source and the second light source.

3. The backlight unit according to claim 2, wherein the first light source and the second light source are both adjacent to the at least one cutout section.

4. The backlight unit according to claim 3, wherein the third light source is adjacent to the first edge other than the at least one cutout section.

5. The backlight unit according to claim 1, wherein a first light ray angle between a line normal to the first edge and a first centermost light ray of the first light source, and a second light ray angle between the line and a second centermost light ray of the second light source are both more than 5 degrees, and a third light ray angle between the line and a third centermost light ray of the third light source is less than 2 degrees.

6. The backlight unit according to claim 1, wherein a distance between the first light source and the second light source is shorter than a distance between the first light source and the third light source.

7. The backlight unit according to claim 1, wherein the at least one hole is filled with a material having a light transmittance different from a light transmittance of the light guide plate.

8. A display device comprising the backlight unit according to claim 1.

9. The backlight unit according to claim 1, wherein the first inclined edge and the second inclined edge are inclined against the intermediate edge and the first edge other than the at least one cutout section.

* * * * *